US012475263B2

(12) United States Patent
Bhunia et al.

(10) Patent No.: US 12,475,263 B2
(45) Date of Patent: Nov. 18, 2025

(54) ELECTROMAGNETIC BASED SECURE CONTACT-LESS INTEGRITY VERIFICATION OF HARDWARE AND/OR SOFTWARE FOR INTEGRATED CIRCUITS

(71) Applicants: University of Florida Research Foundation, Incorporated, Gainesville, FL (US); Brookhaven Science Associates, LLC, Upton, NY (US)

(72) Inventors: Swarup Bhunia, Gainesville, FL (US); Jonathan William Cruz, Gainesville, FL (US); Junjun Huan, Gainesville, FL (US); Soumyajit Mandal, Upton, NY (US)

(73) Assignees: University of Florida Research Foundation, Incorporated, Gainesville, FL (US); Brookhaven Science Associates, LLC, Upton, NY (US)

( * ) Notice: Subject to any disclaimer, the term of this patent is extended or adjusted under 35 U.S.C. 154(b) by 85 days.

(21) Appl. No.: 18/589,578

(22) Filed: Feb. 28, 2024

(65) Prior Publication Data
US 2024/0296252 A1 Sep. 5, 2024

Related U.S. Application Data

(60) Provisional application No. 63/487,652, filed on Mar. 1, 2023.

(51) Int. Cl.
*G06F 21/72* (2013.01)
*G06F 7/58* (2006.01)
*G06F 21/73* (2013.01)

(52) U.S. Cl.
CPC .............. *G06F 21/72* (2013.01); *G06F 7/584* (2013.01); *G06F 21/73* (2013.01)

(58) Field of Classification Search
CPC ........... G06F 21/72; G06F 7/584; G06F 21/73
See application file for complete search history.

(56) References Cited

U.S. PATENT DOCUMENTS

| | | | | |
|---|---|---|---|---|
| 2011/0299678 A1* | 12/2011 | Deas | ....................... | H04L 9/003 380/28 |
| 2013/0077565 A1* | 3/2013 | Jacobs | .................. | H04W 88/08 370/328 |
| 2021/0310996 A1* | 10/2021 | Jain | ....................... | G01S 7/5208 |

* cited by examiner

*Primary Examiner* — Amie C. Lin
(74) *Attorney, Agent, or Firm* — Alston & Bird LLP

(57) ABSTRACT

Various embodiments of the present disclosure provide electromagnetic based secure contact-less integrity verification for an integrated circuit. In one example, an embodiment provides for mapping a signal to a pseudo-random number generator (PRNG) seed value, generating a PRNG output digital signal based on the PRNG seed value, encrypting the PRNG output digital signal based on a cipher function and a key, and generating an electromagnetic signal associated with the PRNG output digital signal to facilitate non-contact sensing of the electromagnetic signal by a probing system.

20 Claims, 16 Drawing Sheets

$P_1 = D_1 \oplus D_2 \oplus D_4 \oplus D_5 \oplus D_7 \oplus D_9 \oplus D_{11} \oplus D_{12} \oplus D_{14} \oplus D_{16} \oplus D_{18} \oplus D_{20} \oplus D_{22} \oplus D_{24} \oplus D_{26} \oplus D_{27} \oplus D_{29} \oplus D_{31}$, $P_2 = D_1 \oplus D_3 \oplus D_4 \oplus D_6 \oplus D_7 \oplus D_{10} \oplus D_{11} \oplus D_{13} \oplus D_{14} \oplus D_{17} \oplus D_{18} \oplus D_{21} \oplus D_{22} \oplus D_{25} \oplus D_{26} \oplus D_{28} \oplus D_{29} \oplus D_{32}$, $P_4 = D_2 \oplus D_3 \oplus D_4 \oplus D_8 \oplus D_9 \oplus D_{10} \oplus D_{11} \oplus D_{15} \oplus D_{16} \oplus D_{17} \oplus D_{18} \oplus D_{23} \oplus D_{24} \oplus D_{25} \oplus D_{26} \oplus D_{30} \oplus D_{31} \oplus D_{32}$, $P_8 = D_5 \oplus D_6 \oplus D_7 \oplus D_8 \oplus D_9 \oplus D_{10} \oplus D_{11} \oplus D_{19} \oplus D_{20} \oplus D_{21} \oplus D_{22} \oplus D_{23} \oplus D_{24} \oplus D_{25} \oplus D_{26}$, $P_{16} = D_{12} \oplus D_{13} \oplus D_{14} \oplus D_{15} \oplus D_{16} \oplus D_{17} \oplus D_{18} \oplus D_{19} \oplus D_{20} \oplus D_{21} \oplus D_{22} \oplus D_{23} \oplus D_{24} \oplus D_{25} \oplus D_{26}$, $P_{32} = D_{27} \oplus D_{28} \oplus D_{29} \oplus D_{30} \oplus D_{31} \oplus D_{32}$,

FIG. 13 ered by the U.S. Department of Energy. The United States government has certain rights in the invention(s).

ELECTROMAGNETIC BASED SECURE CONTACT-LESS INTEGRITY VERIFICATION OF HARDWARE AND/OR SOFTWARE FOR INTEGRATED CIRCUITS

CROSS REFERENCE TO RELATED APPLICATIONS

This application claims priority to U.S. Appl. No. 63/487,652 filed Mar. 1, 2023, the contents of which are incorporated herein in its entirety by reference.

GOVERNMENT SUPPORT

The present application was made with government support under contract number DE-SC0012704 awarded by the U.S. Department of Energy. The United States government has certain rights in the invention(s).

TECHNICAL FIELD

The present application relates to the technical field of integrated circuits. In particular, the invention relates to hardware and/or software verification associated with integrated circuits.

BACKGROUND

Hardware cores are commonly employed in the semiconductor industry. Furthermore, a single System on Chip (SoC) generally comprises one or more third-party semiconductor cores such as one or more hardware Intellectual Property (IP) cores. However, hardware IP cores are generally vulnerable to security concerns such as IP piracy, counterfeiting, reverse engineering, etc. As such, an IP protection technique such as, for example, hardware and/or software integrity verification, can be employed to provide IP protection.

Hardware and software integrity verification for integrated circuits generally involve complex cryptography tasks. Traditional hardware or software authenticating techniques can include inserting a digital signature such as, for example, a fingerprint signature, into a target chip such as a Field Programmable Gate Arrays (FPGA), a hard processor system (HPS) chip, or another type of target chip. Additionally, a sensor can be utilized to read the digital signature information after the target chip is assembled onto a printed circuit board (PCB). A test pin or interface (e.g., a Joint Test Action Group (JTAG) debugging and programming port) of the target chip can additionally be utilized for reading the digital signature information. However, this type of digital signature detection technique is generally inaccessible on consumer products with chips and generally involves a laborious procedure even in situations where test interfaces are available for reading digital signature information.

SUMMARY

In general, embodiments of the present invention provide methods, apparatus, systems, computing devices, computing entities, and/or the like for providing hardware trojan detection using Shapley ensemble boosting. The details of some embodiments of the subject matter described in this specification are set forth in the accompanying drawings and the description below. Other features, aspects, and advantages of the subject matter will become apparent from the description, the drawings, and the claims.

In an embodiment, a method for electromagnetic based secure contact-less integrity verification for an integrated circuit is provided. The method provides for mapping a signal to a pseudo-random number generator (PRNG) seed value, generating a PRNG output digital signal based on the PRNG seed value, encrypting the PRNG output digital signal based on a cipher function and a key, and generating an electromagnetic signal associated with the PRNG output digital signal to facilitate non-contact sensing of the electromagnetic signal by a probing system.

In another embodiment, an apparatus is provided. The apparatus comprises at least one processor and at least one memory including program code. The at least one memory and the program code is configured to, with the at least one processor, cause the apparatus to map a signal to a PRNG seed value, generate a PRNG output digital signal based on the PRNG seed value, encrypt the PRNG output digital signal based on a cipher function and a key, and generate an electromagnetic signal associated with the PRNG output digital signal to facilitate non-contact sensing of the electromagnetic signal by a probing system.

In yet another embodiment, a non-transitory computer storage medium comprising instructions is provided. The instructions are configured to cause one or more processors to at least perform operations configured to map a signal to a PRNG seed value, generate a PRNG output digital signal based on the PRNG seed value, encrypt the PRNG output digital signal based on a cipher function and a key, and generate an electromagnetic signal associated with the PRNG output digital signal to facilitate non-contact sensing of the electromagnetic signal by a probing system.

BRIEF DESCRIPTION OF THE DRAWINGS

Reference will now be made to the accompanying drawings, which are not necessarily drawn to scale, and wherein:

FIG. 13 illustrates an example Hamming code, according to one or more embodiments of the present disclosure;

DETAILED DESCRIPTION

Figure 1:
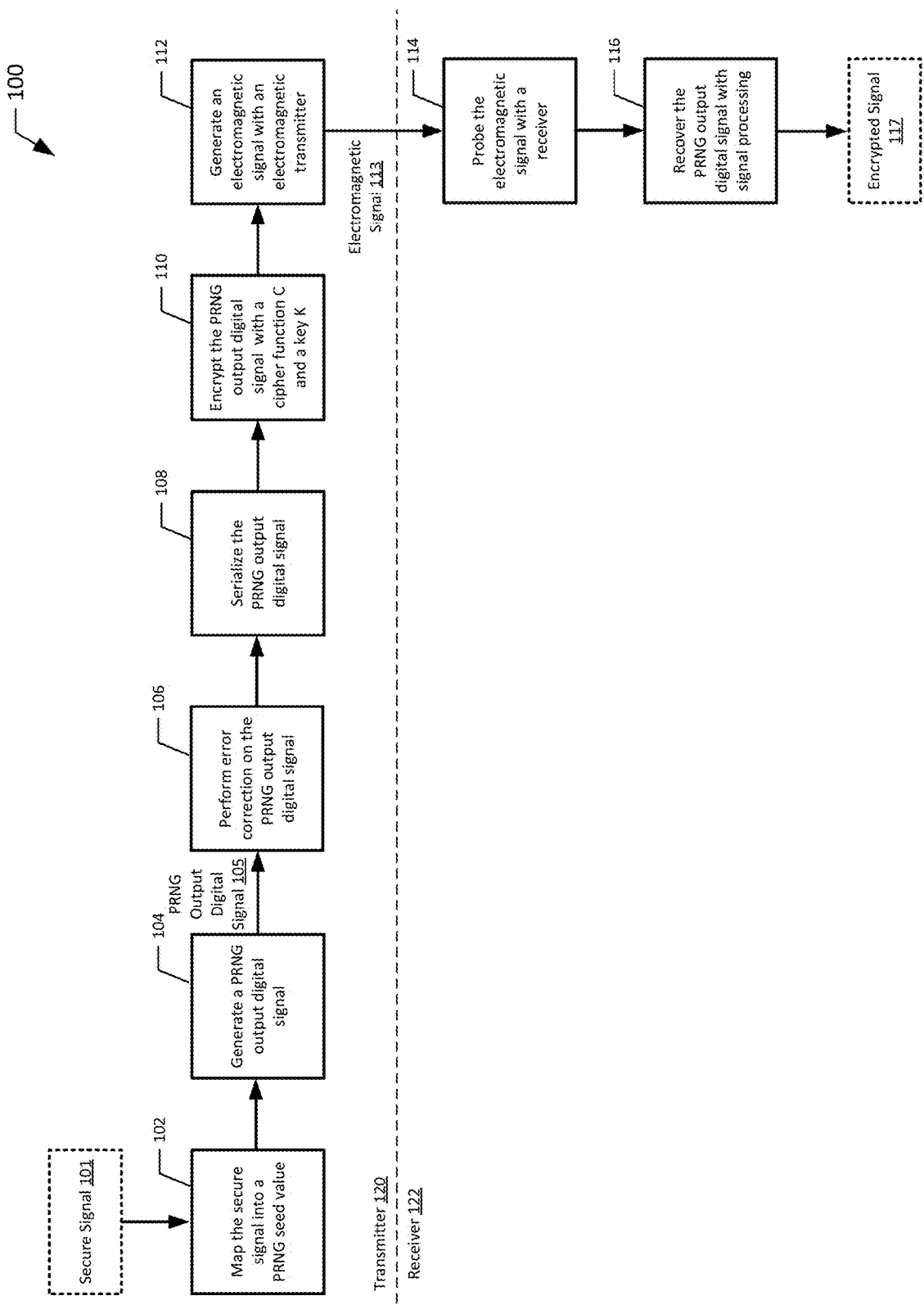
FIG. 1 provides an example flow chart for electromagnetic based secure contact-less integrity verification of hardware and/or software for integrated circuits, according to one or more embodiments of the present disclosure.

The present disclosure more fully describes various embodiments with reference to the accompanying drawings. It should be understood that some, but not all, embodiments are shown and described herein. Indeed, the embodiments may take many different forms, and, accordingly, this disclosure should not be construed as limited to the embodiments set forth herein. Rather, these embodiments are provided so that this disclosure will satisfy applicable legal requirements. Like numbers refer to like elements throughout.

As discussed above, hardware cores are commonly employed in the semiconductor industry. Furthermore, a single System on Chip (SoC) generally comprises one or more third-party semiconductor cores such as one or more hardware Intellectual Property (IP) cores. However, hardware IP cores are generally vulnerable to security concerns such as IP piracy, counterfeiting, reverse engineering, etc. As such, an IP protection technique such as, for example, hardware and/or software integrity verification, can be employed to provide IP protection.

Hardware and software integrity verification for integrated circuits generally involve complex cryptography tasks. Traditional hardware or software authenticating techniques can include inserting a digital signature such as, for example, a fingerprint signature, into a target chip such as a Field Programmable Gate Arrays (FPGA), a hard processor system (HPS) chip, or another type of target chip. Additionally, a sensor can be utilized to read the digital signature information after the target chip is assembled onto a printed circuit board (PCB). A test pin or interface (e.g., a Joint Test Action Group (JTAG) debugging and programming port) of the target chip can additionally be utilized for reading the digital signature information. However, this type of digital signature detection technique is generally inaccessible on consumer products with chips and generally involves a laborious procedure even in situations where test interfaces are available for reading digital signature information.

To address these and/or other issues, various embodiments described herein relate to electromagnetic based secure contact-less integrity verification of hardware and/or software for integrated circuits. Hardware can include, but is not limited to, chips, circuits, integrated circuits, hardware cores, semiconductor cores, IP cores, FPGA logic circuits, application-specific integrated circuits (ASICs), SoCs, or other hardware. Software can include executable instructions (e.g., HPS instructions), Register Transfer Level (RTL) source code, one or more gate-level netlists, and/or other software integrated with hardware. As disclosed herein, RTL source code can model hardware based on flow of signals between hardware components and/or logical operations associated with the signals. For example, a hardware description language (HDL) such as Verilog or Very High Speed Integrated Circuit (VHSIC) HDL (VHDL) can be employed to implement RTL source code, which provides a high-level description of an integrated circuit.

In various embodiments, an authenticating system (e.g., a verification system) for integrity verification of hardware and/or software is provided. The authenticating system can be designed based on a data transmission technique using electromagnetic based side-channel communication to transmit secure information from an information carrier (e.g., hardware and/or software in an integrated circuit) to a receiver. For example, the authenticating system can perform data transmission techniques based on electromagnetic side-channel leakage to conveniently transfer secure information from either hardware or software to an authorized receiver (e.g., as opposed to traditional electrical probing or scan readout-based techniques). The authenticating system can insert secure information with a unique pattern to each target chip (e.g., an integrated circuit, etc.). Additionally, the authenticating system can discover the information in the form of near-field magnetic emissions by probing the target chip without contact or access to test interfaces. For example, the authenticating system can be configured to sense certain strengths of electromagnetic emissions from a hardware or software target.

In various embodiments, protection against EM interference (EMI) can also be provided via the authenticating system. Additionally, in various embodiments, the authenticating system can be used for authenticating hardware and software at different stages of a supply chain related to fabrication and/or manufacturing of a target chip. In various embodiments, the authenticating system can additionally facilitate wireless control flow integrity verification in a HPS during run-time software integrity check. The authenticating system can also authenticate a target chip in an electronic system without the need for a user to deconstruct the electronic system (e.g., either immediately after procurement of the electronic system or at run-time during field deployment of the electronic system). For example, with the authenticating system, a user can authenticate a hardware core or software in an embedded system or a device (e.g., a server, etc.) externally from an enclosure of the embedded system or device. Moreover, with the authenticating system, sensitive types of data or information (e.g., medical sensor outputs or biometric information that is private to the user) can be securely transmitted from an integrated circuit without restrictions on the type of authenticating hardware and/or software.

Additionally, one or more obfuscation techniques can be incorporated into the authenticating system such that the information can be detected and interpreted by an authorized user through non-contact sensing and electromagnetic side-channel analysis. Obfuscation is a technique to protect hardware IP cores against piracy attacks and/or other security vulnerabilities. Obfuscation can modify the structure and/or functionality of a design of a hardware IP core such that it becomes difficult to reproduce the structure and/or functionality of the original design of the hardware IP core from the modified design of the hardware IP core. As such, obfuscation can be employed to further protect hardware IP cores against IP theft, reverse engineering, counterfeiting, piracy attacks and/or other security vulnerabilities. Additionally, obfuscation often employs the addition of obfuscation logic to an original design of a hardware IP core to modify the structure and/or functionality of the original design of the hardware IP core.

In a non-limiting example, the authenticating system can be configured to read a Physical Unclonable Function (PUF) output signature from an integrated circuit without directly contacting the integrated circuit, PCB traces, and/or other connected components on a PCB. In another non-limiting example, the authenticating system can be configured to read a digital signature from an FPGA chip. In various embodiments, the authenticating system can enable secure information to be embedded as a watermark or a tag to allow for magnetic field emission detection by a reliable entity.

In various embodiments, electromagnetic based side-channel communication can be leveraged to intentionally and securely transfer information from a hardware or software to a trusted receiver. The hardware carrier of secure information can be either a commercially available FPGA chip or a custom-made ASIC. Additionally, the software carrier of secure information can be a commercially available HPS. In various embodiments, a non-contact near-field magnetic field emission measurement is employed for receiving and/or detecting secure information at a receiver. In various embodiments, integrity verification can be implemented in a "plug & sense", or a "place & sense" fashion without the need for extra debugging or programming interfaces on a PCB or in a system. In various embodiments, for electromagnetic based hardware integrity verification, the layout and routing of the logic circuits in the FPGA fabric can be configured to optimize interconnect inductance to improve the sensitivity of magnetic field emissions. In various embodiments, a hardware/software integrity verification system can be utilized for chip-to-chip data communications in heterogeneous three-dimensional integration.

In various embodiments, electromagnetic based secure contact-less integrity verification of hardware and/or software for an integrated circuit can be provided by mapping a signal to a pseudo-random number generator (PRNG) seed value, generating a PRNG output digital signal based on the PRNG seed value, encrypting the PRNG output digital signal based on a cipher function and a key, and/or generating an electromagnetic signal associated with the PRNG output digital signal to facilitate non-contact sensing of the electromagnetic signal by a probing system. Hardware and/or software for the integrated circuit can be authenticated based on the non-contact sensing of the electromagnetic signal by the probing system. In various embodiments, an error correction technique can be applied to the PRNG output digital signal. Additionally, the PRNG output digital signal can be serialized. In various embodiments, the PRNG output digital signal can be generated based on an FPGA-based linear-feedback shift register (LFSR) circuit. In various embodiments, the PRNG output digital signal can be generated based on an HPS-based LFSR circuit. In various embodiments, the PRNG output digital signal can be generated based on an ASIC-based LFSR circuit.

In various embodiments of electromagnetic integrity verification systems, matched filtering (e.g., correlation with a known waveform or template) can be provided to maximize the signal-to-noise ratio (SNR) of magnetic field emission measurements. Additionally, in various embodiments, matched filtering can be combined with low-pass or band-pass filtering to improve fidelity of a received electromagnetic emission and/or to remove or minimize electromagnetic interference outside and within a desired signal bandwidth, respectively. In various embodiments, differential signalizing within an FPGA or ASIC logic circuits can be utilized to minimize electromagnetic interference. In various embodiments, customized dummy metal fills can be utilized as electromagnetic shielding layers for ASIC-based hardware integrity verification systems. In various embodiments, impact of localized electromagnetic interference can be reduced by implementing multiple copies of a protected circuit or system in different regions of an FPGA or ASIC.

A. Exemplary Electromagnetic Based Secure Contact-less Integrity Verification of Hardware and/or Software for Integrated Circuits According to various embodiments, an electromagnetic emission based and contactless probing methodology to securely send information is provided, as opposed to traditional techniques of transmitting information through wires and probing the information through a scan readout. By utilizing near-field magnetic emission, secure information such as, for example, a digital watermark signature for authentication, can be transmitted in the form of a magnetic field, thereby allowing non-contact detection of the information by a trustworthy entity. An example flow chart 100 for electromagnetic based secure contact-less integrity verification of hardware and/or software for integrated circuits is shown in FIG. 1, according to one or more embodiments of the present disclosure. The flow chart 100 includes a set of steps to transform a secure signal 101 (e.g., secure signal S) into an encrypted signal 117 (e.g., encrypted signal $S_E$). The secure signal 101 can be, for example, a security-critical signal selected for transmission. For example, the secure signal 101 can include information (e.g., digital signal information) to be securely transmitted from an integrated circuit. Additionally, the secure signal 101 can be unique to the integrated circuit for integrity verification purposes.

In one or more embodiments, the flow chart 100 includes a step 102 that maps the secure signal (e.g., the secure signal 101) into a PRNG seed value. The flow chart 100 additionally or alternatively includes a step 104 that generates a PRNG output digital signal (e.g., PRNG output digital signal 105). For example, the PRNG output digital signal can be a signature electrical signal (SE). In one or more embodiments, the seed value can be utilized to generate the PRNG output digital signal through a pseudorandom number generation circuit incorporated into hardware (e.g., an FPGA fabric or an ASIC fabric) or software (e.g., an HPS). The flow chart 100 additionally or alternatively includes a step 106 that performs error correction on the PRNG output digital signal (e.g., the PRNG output digital signal 105). For example, an error detection and correction code can be added to the PRNG output digital signal. The flow chart 100 additionally or alternatively includes a step 108 that serializes the PRNG output digital signal (e.g., the PRNG output digital signal 105). The flow chart 100 additionally or alternatively includes a step 110 that encrypts the PRNG output digital signal (e.g., the PRNG output digital signal 105) with a cipher function C and a key K. The cipher function C can encrypt the PRNG output digital signal into encrypted data associated with ciphertext (e.g., an encrypted version of the PRNG output digital signal) using the key K. The key K can be an encryption key (e.g., a cryptographic key) associated with a certain number of bits. The flow chart 100 additionally or alternatively includes a step 112 that generates an electromagnetic signal (e.g., electromagnetic signal 113) with a transmitter (e.g., transmitter 120). The transmitter can be an electromagnetic transmitter. For example, the PRNG output digital signal (e.g., the PRNG output digital signal 105) can be converted into the electromagnetic signal in a bit-wise fashion with an electromagnetic transmitter. The flow chart 100 additionally or alternatively includes a step 114 that probes the electromagnetic signal (e.g., the electromagnetic signal 113) with a receiver (e.g., receiver 122). For example, the receiver can be a probing system that employs a near-field probe (e.g., an electromagnetic receiver) to measure and/or detect the electromagnetic signal (e.g., the electromagnetic signal 113). The flow chart 100 additionally or alternatively includes a step 116 that recovers the PRNG output digital signal (e.g., the PRNG output digital signal 105) with signal processing. For example, the electromagnetic signal (e.g., the electromagnetic signal 113) can be processed using one or more signal processing techniques such as, but not limited to, matched filtering, low-pass filtering, and/or another filtering technique to maximize an SNR while also minimizing noise. The recovered PRNG output digital signal (e.g., the PRNG output digital signal 105) can correspond to the encrypted signal 117. Accordingly, detected electromagnetic signals can be decoded and recovered with improved efficiency and/or accuracy to uncover a correct signature bitstream.

In various embodiments, the flow chart 100 can be related to an FPFGA fabric-based system. For example, to achieve hardware integrity verification, an authenticating system based on pseudo-random number digital signature generation and near-field magnetic emission detection on the FPGA fabric of an integrated circuit can be utilized.

In various embodiments, the step 102, the step 104, the step 106, the step 108, the step 110, and/or the step 112 can be implemented via the transmitter 120. Additionally, in various embodiments, the step 114 and/or the step 116 can be implemented via the receiver 122.

Figure 2:
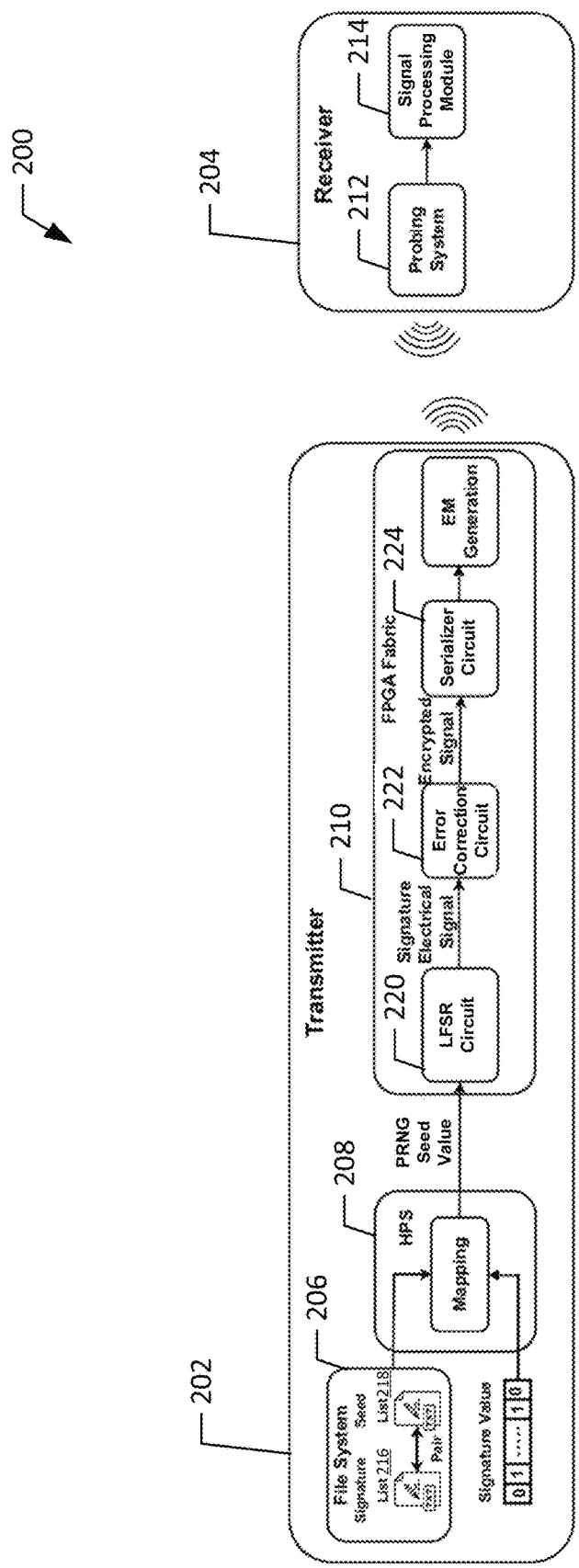
FIG. 2 provides an example architecture of near-field magnetic emission-based hardware integrity verification for a Field Programmable Gate Arrays (FPGA) fabric according to one or more embodiments of the present disclosure.

An example architecture 200 of near-field magnetic emission-based hardware integrity verification for an FPGA fabric is shown in FIG. 2, according to one or more embodiments of the present disclosure. The architecture 200 can be configured as a near-field magnetic emission-based hardware authenticating system. Additionally, the architecture 200 can include a transmitter 202 and a receiver 204. In various embodiments, the transmitter 202 can correspond to the transmitter 120 and the receiver 204 can correspond to the receiver 122. The transmitter 202 can include a file system 206, an HPS 208, and/or an FPGA fabric 210. The receiver 204 can include a probing system 212 and/or a signal processing module 214. In various embodiments, the probing system 212 can include a magnetic probe and/or a high-speed oscilloscope. The file system 206 can store a signature list 216 and a seed list 218. The signature list 216 can include signature values that are generated offline through a PRNG circuit. For example, the signature list 216 can include millions of signature values. Additionally, the respective signature values of the signature list 216 can be paired with a corresponding seed value of the seed list 218. The HPS 208 can acquire an intended digital signature value for writing the signature to the hardware based on user input. The HPS 208 can additionally search for a possible match in the signature list 216. Additionally, the HPS 208 can output the corresponding seed value to the PRNG in the FPGA fabric 210 for generating electromagnetic field emissions. In this manner, a magnetic field-based signature can be produced for a corresponding digital signature value inputted by a user through a digital to magnetic field signal mapping mechanism.

Figure 3:
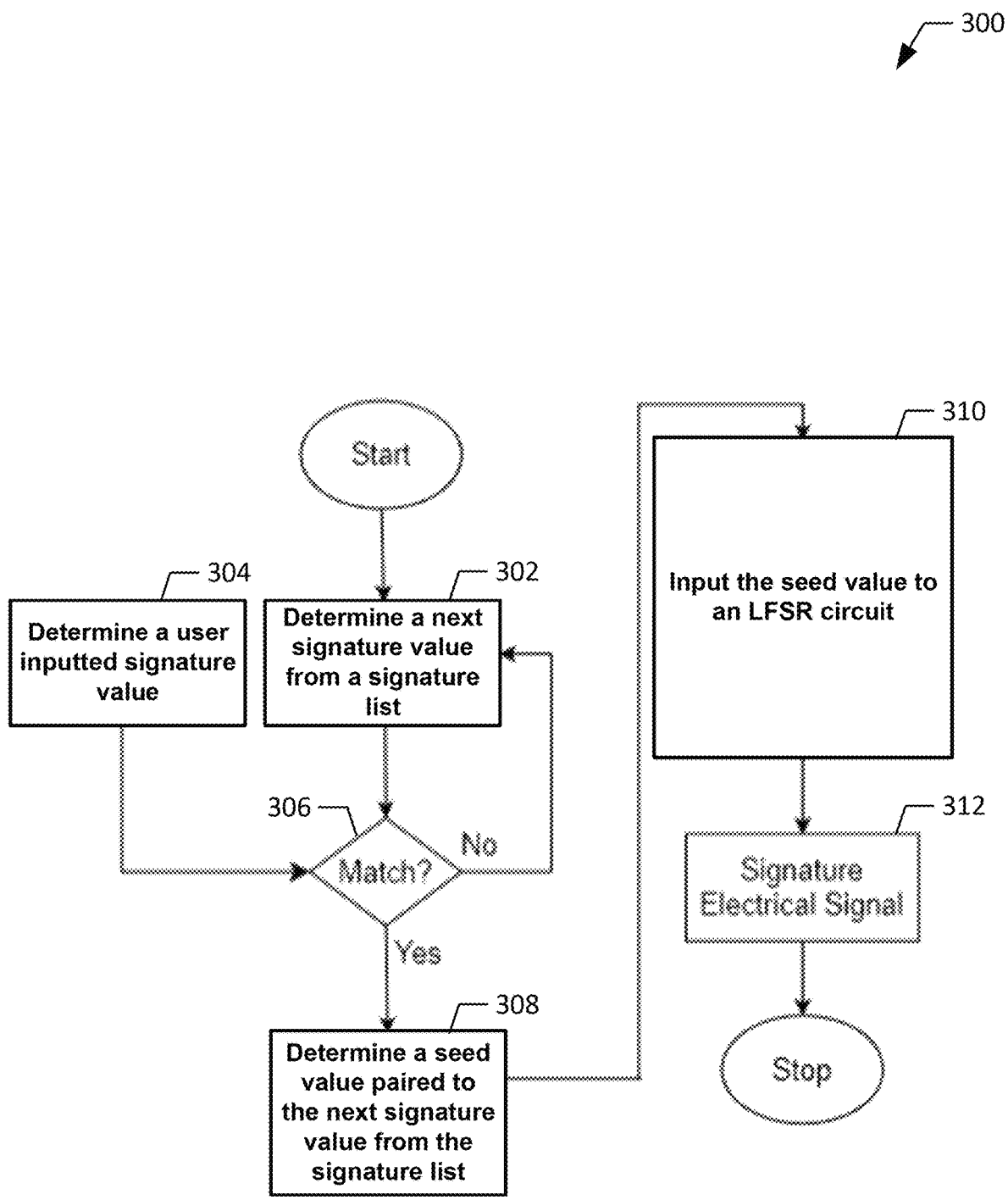
FIG. 3 provides an example flow chart for mapping an input signal to an output signal, according to one or more embodiments of the present disclosure.

An example flow chart 300 for mapping an input signal to an output signal is shown in FIG. 3, according to one or more embodiments of the present disclosure. For example, the flow chart 300 can illustrate mapping of the secure signal 101 to the PRNG digital output signal (e.g., the PRNG output digital signal 105) via step 102 and step 104 of the flow chart 100 illustrated in FIG. 1. The flow chart 300 includes a step 302 that determines a next signature value from a signature list. The flow chart 300 also includes a step 304 that determines a user inputted signature value. Additionally, at step 306 of the flow chart 300, it is determined whether a match exists between the user inputted signature value and the next signature value from the signature list. For example, the user inputted signature value and the next signature value from the signature list can be compared to determine whether a match exists. If no, the flow chart 300 can return to step 302 to determine a new signature value from the signature list. However, if yes, the flow chart 300 can proceed to step 308 to determine a seed value paired to the next signature value from the signature list. The seed value can be, for example, a PRNG seed value. The flow chart 300 also includes a step 310 that inputs the seed value to an LFSR circuit to generate a signature electrical signal 312. The signature electrical signal 312 can be, for example, a PRNG output digital signal (e.g., the PRNG output digital signal 105).

Referring back to FIG. 2, the probing system 212 can integrate a data acquisition (DAQ) system, such as a digitizer card or high-speed oscilloscope, with a near-field magnetic sensor (e.g., a probe) and/or a target chip for signature insertion and detection. For example, the probing system 212 can utilize an external trigger signal to activate each measurement. The probing system 212 can also define one signature period during which real-time signal averaging can be implemented on the acquired magnetic field signal (e.g., converted to voltage) to improve SNR. The signal processing module 214 can be configured to enhance the SNR of the measured magnetic field signature by minimizing the stochastic noise through a low-pass filter while also maximizing the signal amplitude through matched filtering.

Referring back to the transmitter 202, the FPGA fabric 210 can be a hardware architecture where an electrical signal that carries the digital signature information is generated. The FPGA fabric 210 can also be the source of the magnetic field emissions via the transmitter 202. Since the magnetic field signal is emanated from the FPGA fabric 210, the authenticating system can be identified as one designed for pure hardware. In various embodiments, the FPGA fabric 210 includes an LFSR circuit 220, an error correction circuit 222, and/or a serializer circuit 224. The LFSR circuit 220, the error correction circuit 222, and/or the serializer circuit 224 can be logic circuits of the FPGA fabric 210 for pseudo-random number generation, error correction, and parallel-in to serial-out conversion, respectively. In various embodiments, the LFSR circuit 220 can be an FPGA-based LFSR circuit.

In various embodiments, the LFSR circuit 220 can receive a seed value (e.g., the initial state of the shift register) and generate a 1-bit output message at the rising-edge of each clock cycle. In various embodiments, the seed value can be a PRNG seed value. An n-bit digital signature with high entropy (e.g., no predictable patterns seen from a pool of different signatures) then requires continuous running of the LFSR circuit 220 for n clock cycles to generate n pseudo-random output bits. The n-bit digital signature generated can then encoded by the error correction circuit 222 that utilizes an error correction algorithm (e.g., a Hamming code) to detect and correct single bit errors. The final encoded bit stream (e.g., a Hamming vector) is then sequentially and periodically output bit-by-bit via the serializer circuit 224. In various embodiments, the serializer circuit 224 can be a parallel-in to serial-out logic circuit. The serial output provided by the serializer circuit 224 can be encrypted with a symmetric key for obfuscation purposes and repeatedly written into different registers. Accordingly, this stream cipher based cryptographic technique can be used to support any possible length of the plain text represented by the Hamming vector when the key is relatively short and has a fixed length.

In various embodiments, the FPGA fabric 210 can simultaneously write each bit of the encoded bit sequence sequentially into several registers mapped across the device (e.g., 5000) to generate magnetic field emissions with significantly improved strength. As a result, the initially weak emission signals can be amplified above the ambient noise floor to increase measurement SNR. Layout and routing of the logic circuit can be configured in the FPGA fabric 210 to increase inductance of the interconnects, which further increases the strength of the magnetic field emissions. The two sequential logic blocks of the FPGA fabric 210, namely the LFSR circuit 220 and the serializer circuit 224, can be clocked by a ring oscillator clock built using logic gates.

Figure 4:
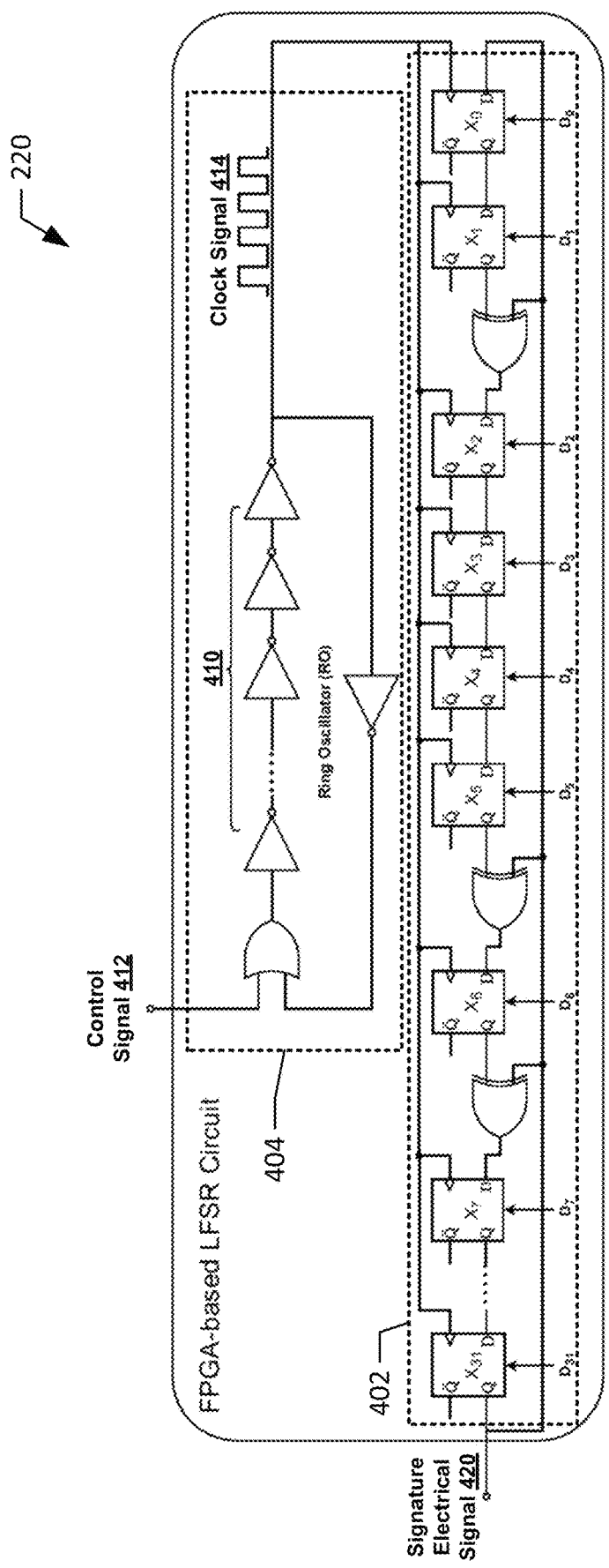
FIG. 4 illustrates an example FPGA-based a linear-feedback shift register (LFSR) circuit, according to one or more embodiments of the present disclosure.

An example LFSR circuit 220 is shown in FIG. 4, according to one or more embodiments of the present disclosure. As illustrated in FIG. 4, the LFSR circuit 220 includes an LFSR 402 and a ring oscillator 404. The ring oscillator 404 can include a set of inverters 410 that provide a clock signal 414 based on a control signal 412. In certain embodiments, the set of inverters 410 can include an even number of inverters (e.g., 800 inverters, etc.). In certain embodiments, the control signal 412 can be a seed value (e.g., a PRNG seed value). In certain embodiments, the ring oscillator 404 can be configured as a pre-tuned 50 MHz oscillator that provides a stable clock via the clock signal 414. In various embodiments, the LFSR circuit 220 can utilize the ring oscillator 404 as a clock source to add frequency variations to different chips to generate unique chip-specific electromagnetic signal patterns. For writing a digital signature with optimal uniqueness to the FPGA fabric 210, the signature can be serialized to a stream of bits that are repeated periodically to carry the maximal amount of information. The periodic signals can be generated to maximize the number of signal averages for optimal SNR. Additionally, the FPGA fabric 210 can be configured to detect a trigger pulse (e.g., a synchronization sequence) to signal the start and stop of each measurement. In various embodiments, the serializer circuit 224 can be utilized to convert the state of the LFSR 402 into a single-bit serial output.

In various embodiments, the LFSR 402 can be a parallel-in serial-out shift register where input bits are determined by a linear feedback function of previous states. In various embodiments, the feedback function of the LFSR 402 can correspond to a set of logic gates (e.g., a set of exclusive-or (XOR) gates or modulo-2 adders) that define a feedback polynomial to maximize a repetition length and randomness of an output bit sequence for a signature electrical signal 420. The signature electrical signal 420 can correspond to the PRNG output digital signal 105. In certain embodiments, the LFSR 402 can be a 32-bit Galois-field LFSR with feedback taps at locations 1, 5, 6, and 31 to maximize the number of possible states such that the signature electrical signal 420 includes an output bit sequence of maximal length.

Figure 5:
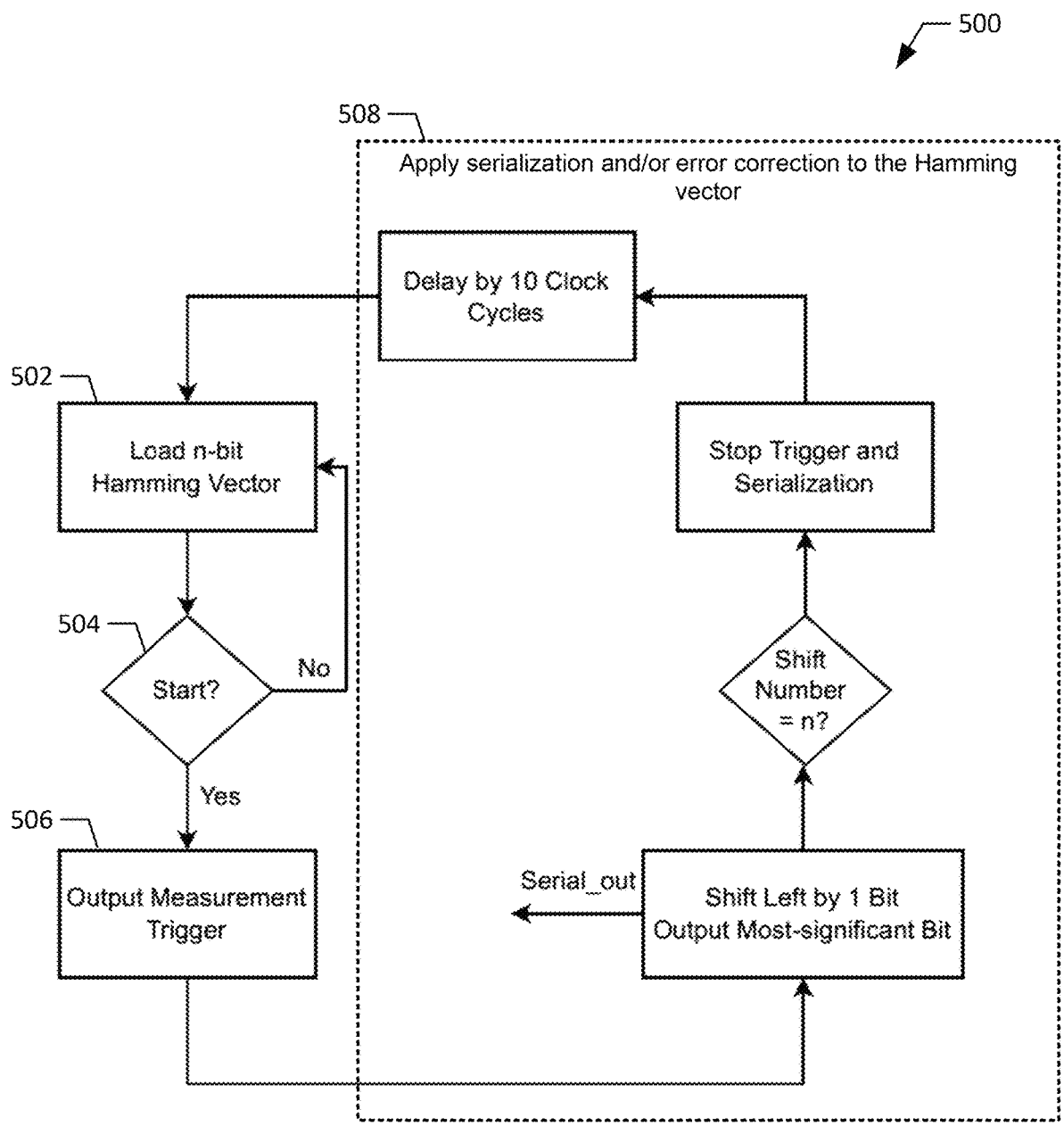
FIG. 5 provides an example flow chart for providing parallel to serial conversion of an LFSR periodic output signal with error correction via a state machine circuit.

An example flow chart 500 for providing parallel to serial conversion of an LFSR output signal with error correction via a state machine circuit is shown in FIG. 5, according to one or more embodiments of the present disclosure. For example, the flow chart 500 can illustrate a state machine loop for providing error correction and/or serializing a signature electrical signal (e.g., the PRNG output digital signal 105) via step 106 and/or step 108 of the flow chart 100 illustrated in FIG. 1. The flow chart 500 includes a step 502 that loads an n-bit Hamming vector. The flow chart 500 also includes a step 504 that determines whether a start signal is activated. For example, the flow chart 500 can start from an initial state of reading the Hamming vector and can advance to the next state in response to a "start" signal being activated. The "start" signal can be tied to a complete conversion of a digital signature to a Hamming vector (e.g., a signature with parity bits). The flow chart 500 also includes a step 506 that outputs a measurement trigger. For example, the flow chart 500 can output a measurement trigger after one clock cycle. The flow chart 500 also includes a step 508 that applies serialization and/or error correction to the Hamming vector. For example, at the step 508, the flow chart 500 can start to (i) continuously fill the single-bit shift register with the Hamming vector as the seed value once at each rising clock edge, and/or (ii) simultaneously export the most-significant bit as the single-bit output message (e.g., as a voltage pulse). Then, after the shift register execution counts to the length of the signature, both the message output and the measurement trigger can stop. Accordingly, the generation of a serialized digital signature (e.g., as a voltage) can be completed over one period. Additionally, with the step 508 of the flow chart 500, the delay before generation of the next signature period can be produced at the final state. The loop for the flow chart 500 can then start over when the state machine returns to the initial state to initiate a new signature serialization process.

In other embodiments, the flow chart 100 can be related to an HPS-based system. For example, a software integrity verification method based on near-field magnetic emissions can be alternatively utilized instead of an FPGA fabric. In various embodiments, the HPS can be configured for providing a random number generation mechanism, an error correction function, a bit-wise magnetic field modulation, and/or a data encryption algorithm.

Figure 6:
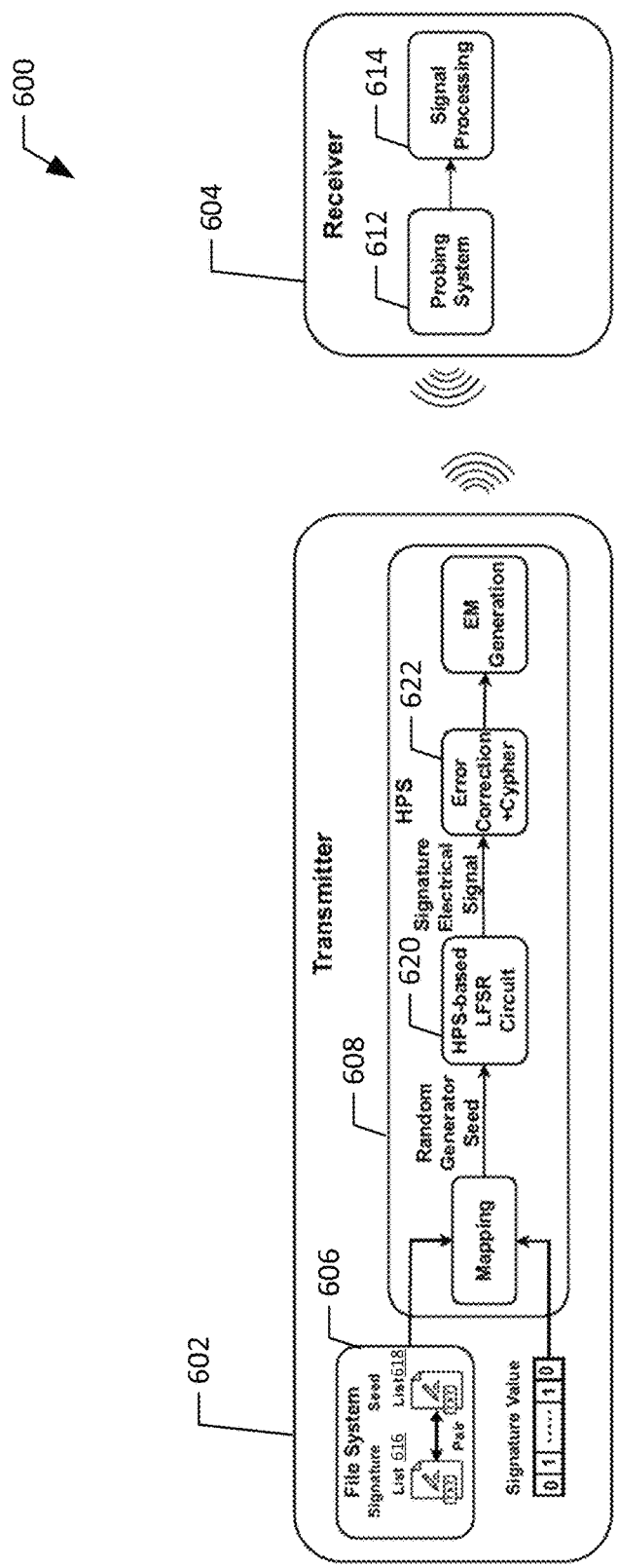
FIG. 6 provides an example architecture of near-field magnetic emission-based software integrity verification for a hard processor system, according to one or more embodiments of the present disclosure.

An example architecture 600 of near-field magnetic emission-based software integrity verification for a hard processor system is shown in FIG. 6, according to one or more embodiments of the present disclosure. The architecture 600 can be configured as a near-field magnetic emission-based software authenticating system. Additionally, the architecture 600 can include a transmitter 602 and a receiver 604. In various embodiments, the transmitter 602 can correspond to the transmitter 120 and the receiver 604 can correspond to the receiver 122. The transmitter 602 can include a file system 606, and/or an HPS 608. The receiver 604 can include a probing system 612 and/or a signal processing module 614. In various embodiments, the probing system 212 can include a magnetic probe and/or a high-speed oscilloscope. The file system 606 can store a signature list 616 and a seed list 618. The signature list 616 can include signature values that are generated offline through a PRNG circuit. For example, the signature list 616 can include millions of signature values. Additionally, the respective signature values of the signature list 616 can be paired with a corresponding seed value of the seed list 618. The HPS 608 can acquire an intended digital signature value for writing the signature to the hardware based on user input. The HPS 608 can additionally search for a possible match in the signature list 616. Additionally, the HPS 608 can output the corresponding seed value to the PRNG for generating electromagnetic field emissions. In this manner, a magnetic field-based signature can be produced for a corresponding digital signature value inputted by a user through a digital-to-magnetic field signal mapping mechanism.

With the architecture 600, functions can be executed in the processor through instructions instead of on the FPGA fabric. Accordingly, the architecture 600 can be implemented for applications where only a HPS core exists (e.g., in a computer system or on an embedded hardware platform). Similar to the hardware authentication system in FIG. 3, the probing system of the architecture 600 consists of a DAQ system (e.g., a digitizer card or high-speed oscilloscope), a near-field magnetic sensor (e.g., probe), and the target integrated circuit. An identical signal processing module is also embedded to maximize SNR of the measured magnetic field signal through filtering mechanisms. In one or more embodiments, the signature list 616 and the seed list 218 pairs can be saved in the file system, which can be booted from an external memory dedicated to the SoC. Additionally, a mapping procedure for the architecture can be implemented through the processor to find the seed value(s) that generate digital signatures with patterns that match one or more signature values in the signature list 616.

Additionally, instead of operating random number generation and error correction mechanisms through logic circuits, the architecture 600 can execute the two functions by providing instructions to the processor in the form of a high-level programming language.

In this regard, the HPS 608 can include an HPS-based LFSR circuit 620. The pseudo-random number generator clocked by the HPS-based LFSR circuit 620 can be an LFSR software function running recursively to generate periodic multiple-bit digital signatures with a value specified by the user input. In various embodiments, an error correction mechanism 622 of the HPS-based LFSR circuit 620 can utilize a Hamming code algorithm to detect and correct bit errors produced during near-field magnetic emission measurements. A processor-based input/output pin of the HPS-based LFSR circuit 620 can also be configured by setting and clearing the bit value for the specific input/output pin in the register address to deliver trigger signals to the probing system. In certain embodiments, this trigger pin can be replaced by an embedded synchronization sequence.

Figure 7:
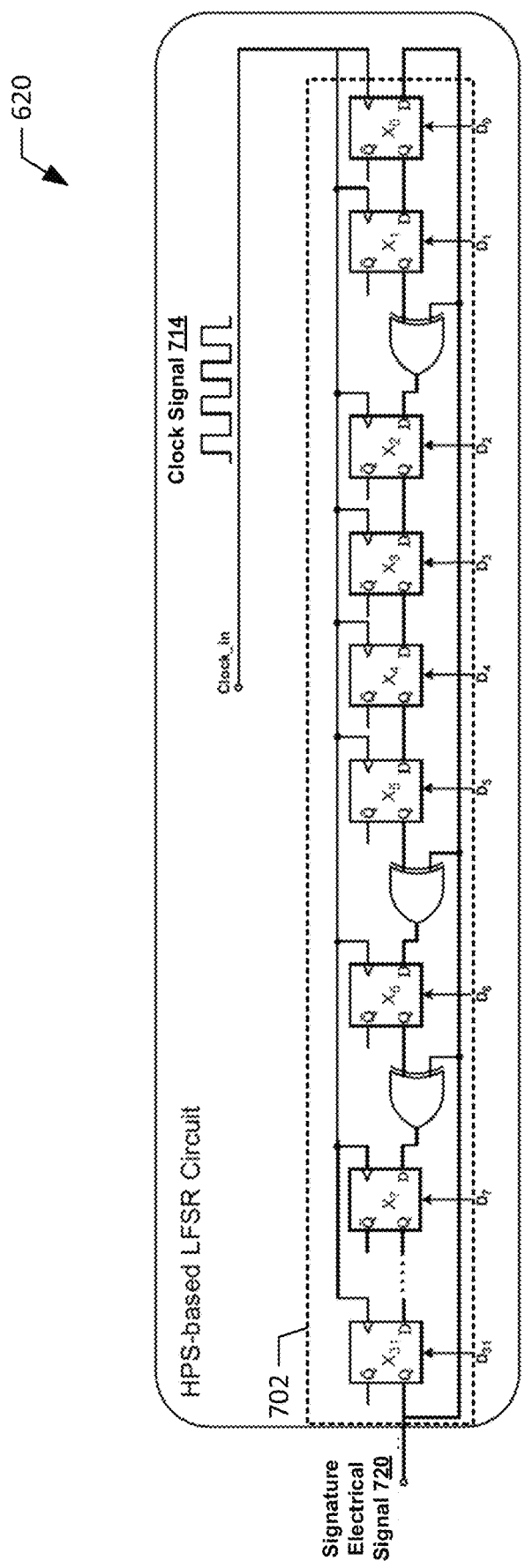
FIG. 7 illustrates an example hard processor system (HPS)-based LFSR circuit, according to one or more embodiments of the present disclosure.

An example the HPS-based LFSR circuit 620 is shown in FIG. 7, according to one or more embodiments of the present disclosure. As illustrated in FIG. 7, the HPS-based LFSR circuit 620 includes an LFSR 702 404. In various embodiments, a clock signal 714 can be provided to the LFSR 702. In various embodiments, the LFSR 702 can be a parallel-in serial-out shift register where input bits are determined by a linear feedback function of previous states based on the clock signal 714. In various embodiments, the feedback function of the LFSR 702 can correspond to a set of logic gates (e.g., a set of XOR gates or modulo-2 adders) that define a feedback polynomial to maximize a repetition length and randomness of an output bit sequence for a signature electrical signal 720. The signature electrical signal 720 can correspond to the PRNG output digital signal 105. In certain embodiments, the LFSR 702 can be a 32-bit Galois-field LFSR with feedback taps at locations 1, 5, 6, and 31 to maximize the number of possible states such that the signature electrical signal 720 includes an output bit sequence of maximal length.

Returning back to FIG. 6, after the Hamming vector is generated, magnetic emissions can be modulated by the amplitude of each bit in the vector such that the sensitivity of the magnetic field emissions is optimized during measurement and the measured signals can carry the most information (e.g., to provide high signature uniqueness). Therefore, the architecture 600 can utilize processor instructions that produce strong magnetic field emissions suitable for detection. For example, writing one word into a processor register produces strong magnetic field emissions. Similar instructions that produce strong magnetic field emissions can be alternatively employed.

Figure 8:
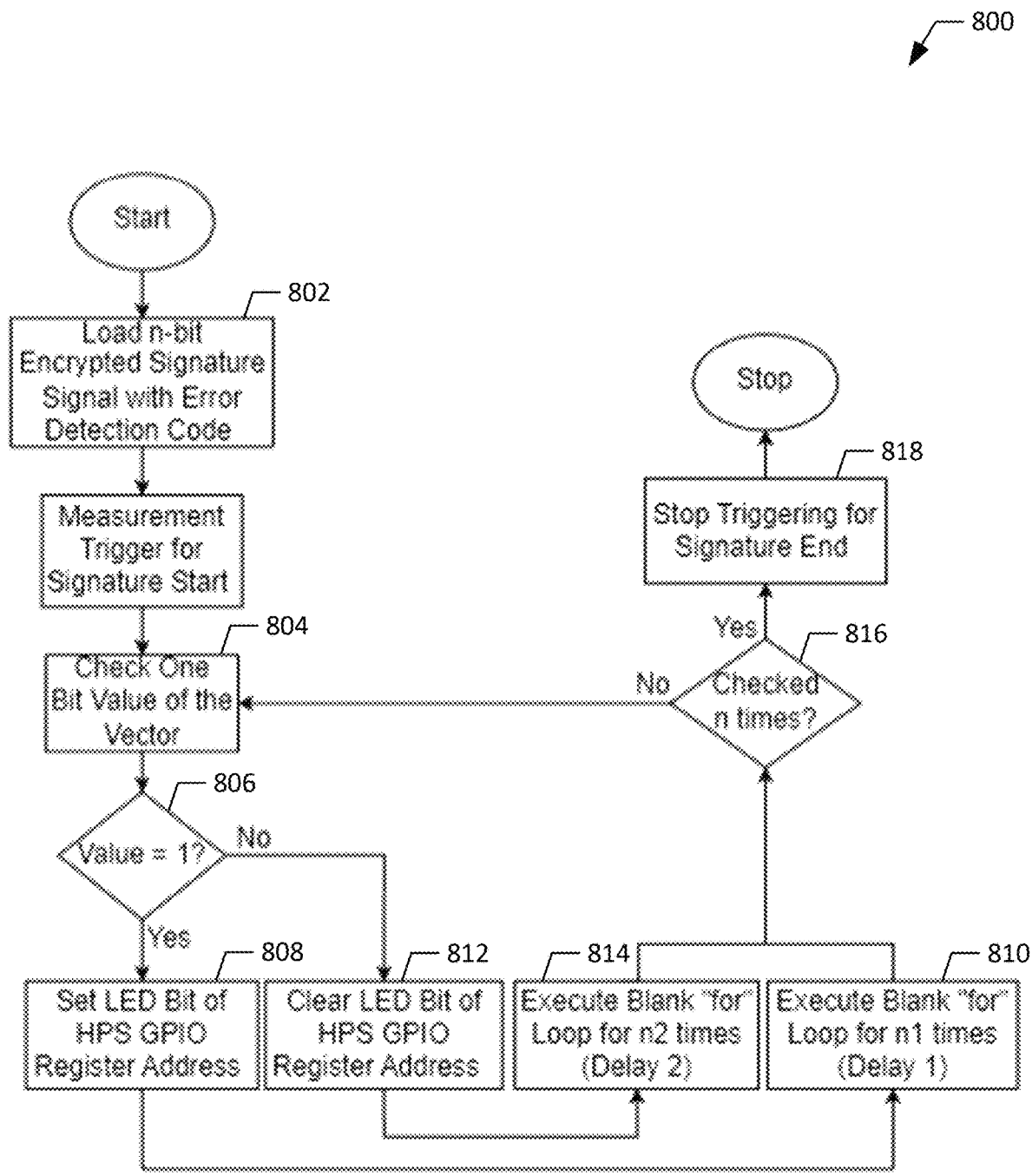
FIG. 8 provides an example flow chart for generating an electromagnetic signal in an HPS instance of an electromagnetic-based integrity verification system, according to one or more embodiments of the present disclosure.

An example flow chart 800 for generating an electromagnetic signal in an HPS instance of an electromagnetic-based integrity verification system is shown in FIG. 8, according to one or more embodiments of the present disclosure. For example, the flow chart 800 can illustrate generating an electromagnetic signal (e.g., the electromagnetic signal 113) with an electromagnetic transmitter (e.g., the transmitter 120) via step 112 of the flow chart 100 illustrated in FIG. 1. In various embodiments, the flow chart 800 can correspond to a modulation flow for generating an electromagnetic signal in an HPS instance of an electromagnetic-based integrity verification system. The flow chart 800 includes a step 802 that loads an n-bit encrypted signature signal with error detection code. The encrypted signature signal can be, for example, a Hamming vector for error detection. In various embodiments, loading of the n-bit encrypted signature signal can be utilized as a measurement trigger for signature start. For example, loading of the n-bit encrypted signature signal can be utilized as a measurement trigger for controlling the processor-based input/output pin to start outputting trigger signals.

The flow chart 800 also provides for sequentially checking every bit value of the signature. If the bit value is equal to a logic "1", the LED bit in the input/output register address is set and a delay is set by looping through n1 successive blank "for" loops. Otherwise, the LED bit is cleared with a delay set by executing n2 successive blank "for" loops. For example, the flow chart 800 includes a step 804 that checks one bit value of the vector. The flow chart 800 also includes a step 806 that determines whether the bit value is equal to a logic "1". If yes, the flow chart 800 includes a step 808 that sets an LED bit of an HPS general-purpose input/output (GPIO) register address and/or a step 810 that executes a blank "for" loop for n1 times (e.g., a first delay). However, if no, the flow chart 800 includes a step 812 that clears an LED bit of an HPS GPIO register address and/or a step 814 that executes a blank "for" loop for n2 times (e.g., a second delay). The flow chart 800 also includes a step 816 that determined whether bit values are checked a certain number of times (e.g., checked n times). After the values of all signature bits are examined, the flow chart 800 includes a step 818 that stops triggering for a signature end by ending the output of measurement triggers. As such, at step 818, modulation of one magnetic field emission signal period can be concluded. The measurement of the next signal period can continue after a delay is created through execution of n3 blank "for" loops and/or transmitting a new trigger signal.

In other embodiments, the flow chart 100 can be related to an ASIC-based system. For example, an integrity verification method based on near-field magnetic emissions can be alternatively utilized instead of an FPGA fabric or an HPS-based system. Accordingly, in certain embodiments, the electromagnetic based integrity verification with a hardware verification system can be applied to a gate array ASIC customized for electromagnetic field-based secure information transmission and reception. The ASIC system can comprise a similar architecture as the architecture 200 and/or the architecture 600 with a file system, an HPS and a custom gate array instead of a standardized FPGA fabric within the transmitter. Additionally, the ASIC system can include a probing system and a signal processing module within the receiver. At the transmitter, the lists of digital signatures and corresponding PRNG seeds can be stored in the file system. The ASIC-based system can receive a signature value input from the user, search for a match in the signature list, and/or output the paired seed value. In this regard, the ASIC-based system can include an ASIC-based LFSR circuit 920.

Figure 9:
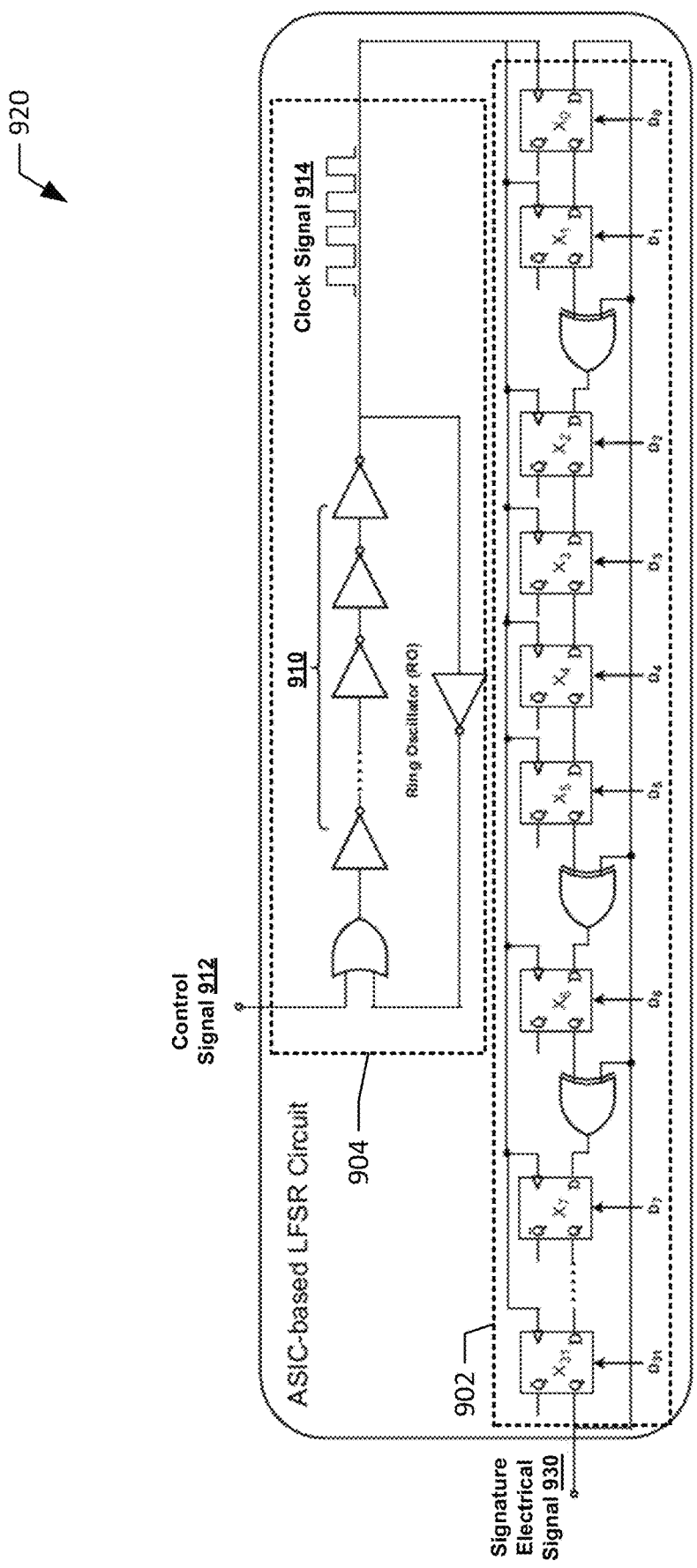
FIG. 9 illustrates an example application-specific integrated circuits (ASIC)-based LFSR circuit, according to one or more embodiments of the present disclosure.

An example ASIC-based LFSR circuit 920 is shown in FIG. 9, according to one or more embodiments of the present disclosure. As illustrated in FIG. 9, the LFSR circuit 920 includes an LFSR 902 and a ring oscillator 904. The ring oscillator 904 can include a set of inverters 910 that provide a clock signal 914 based on a control signal 912. In certain embodiments, the set of inverters 910 can include an even number of inverters (e.g., 800 inverters, etc.). In certain embodiments, the control signal 912 can be a seed value (e.g., a PRNG seed value). In certain embodiments, the ring oscillator 904 can be configured as a pre-tuned 50 MHz oscillator that provides a stable clock via the clock signal 914. In various embodiments, the LFSR circuit 920 can utilize the ring oscillator 904 as a clock source to add frequency variations to different chips to generate unique chip-specific electromagnetic signal patterns. For writing a digital signature with optimal uniqueness to the FPGA fabric 210, the signature can be serialized to a stream of bits that are repeated periodically to carry the maximal amount of information. The periodic signals can be generated to maximize the number of signal averages for optimal SNR. Additionally, the FPGA fabric 210 can be configured to detect a trigger pulse (e.g., a synchronization sequence) to signal the start and stop of each measurement. In various embodiments, the serializer circuit 224 can be utilized to convert the state of the LFSR 902 into a single-bit serial output.

In various embodiments, the LFSR 902 can be a parallel-in serial-out shift register where input bits are determined by a linear feedback function of previous states. In various embodiments, the feedback function of the LFSR 902 can correspond to a set of logic gates (e.g., a set of XOR gates or modulo-2 adders) that define a feedback polynomial to maximize a repetition length and randomness of an output bit sequence for a signature electrical signal 930. The signature electrical signal 930 can correspond to the PRNG output digital signal 105. In certain embodiments, the LFSR 902 can be a 32-bit Galois-field LFSR with feedback taps at locations 1, 5, 6, and 31 to maximize the number of possible states such that the signature electrical signal 930 includes an output bit sequence of maximal length.

In various embodiments, the ring oscillator 904, as illustrated in FIG. 9, can comprise a gate array that processes the seed value. The LFSR 902 can also generate the signature electrical signal 930 and combine the output signal with error correction parity bits and serialize the error correction coded signal for high electromagnetic emission sensitivity. Then, at the receiver, electromagnetic signals can be measured through a probing system comprising a near-field magnetic probe, a scanning platform for scanning the probe, and a DAQ system (e.g., a digitizer card or high-speed oscilloscope). The signal processing module can maximize the SNR while also minimizing noise. Accordingly, the ASIC-based system can provide improved customizability during placement and routing to improve the SNR of the desired electromagnetic emission signals by maximizing inductance of the interconnects, as compared to a standardized FPGA fabric with limited customizability of integrated circuit metallization.

Figure 10:
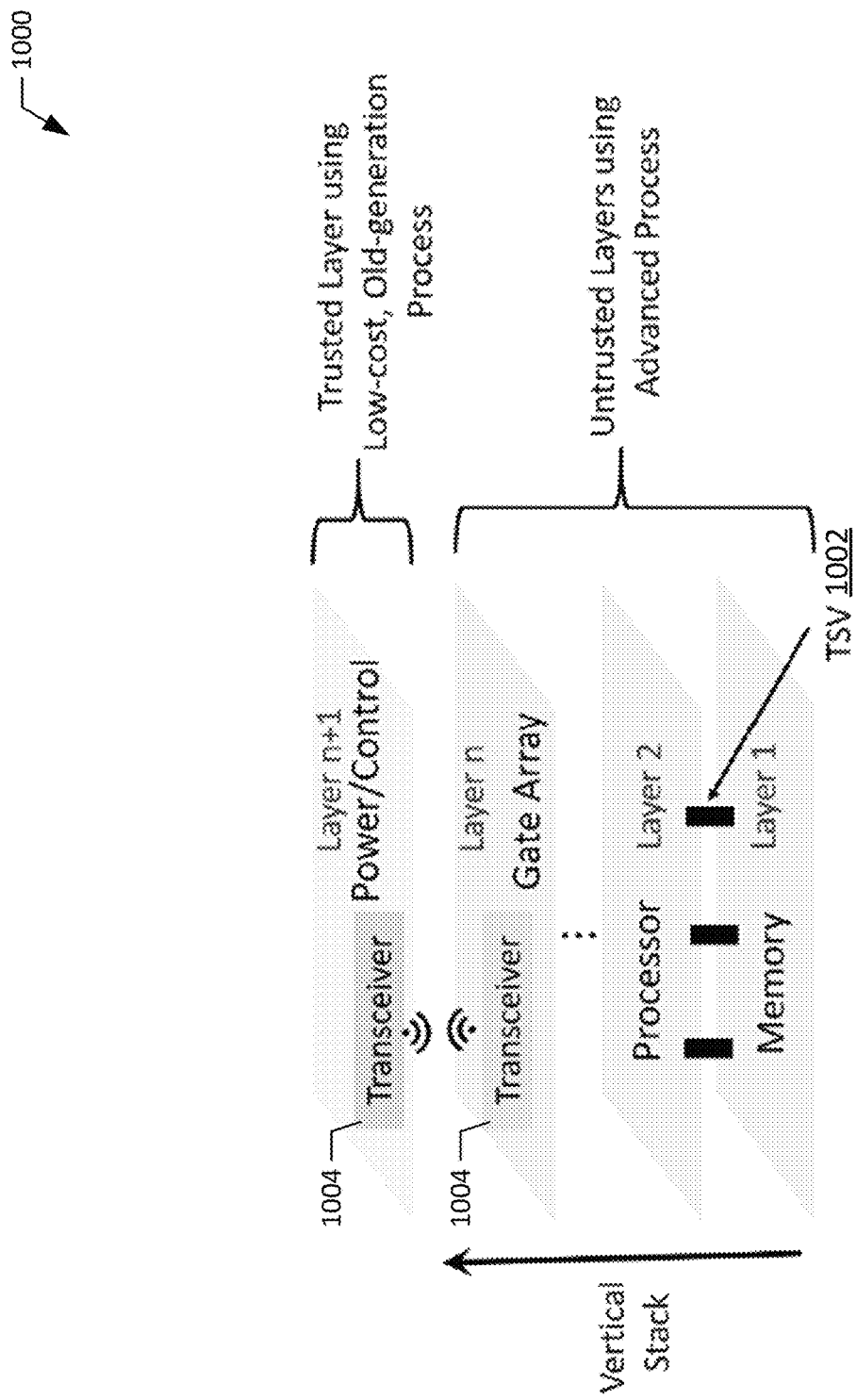
FIG. 10 illustrates an example heterogeneous three-dimensional (3D) integrated circuit using electromagnetic based data communications, according to one or more embodiments of the present disclosure.

In certain embodiments, a hardware/software integrity verification system can be provided for data communication in three-dimensional (3D) integrated circuits utilizing heterogeneous integration. A heterogeneous 3D integrated circuit 1000 using electromagnetic based data communications is shown in FIG. 10, according to one or more embodiments. The 3D integrated circuit 1000 can include integrated circuit layers for different functions that are vertically stacked with through-silicon vias (TSVs) or direct wafer-wafer bonds as interconnects for electrical conductivity. Accordingly, low-latency communications between integrated circuit layers of the 3D integrated circuit 1000 can be provided. In one or more embodiments, a TSV 1002 can be provided between a layer 1 (e.g., a memory) and a layer 2 (e.g., a processor) of the 3D integrated circuit 1000. However, the top layer (n+1) of the 3D integrated circuit 1000 can be implemented without a TSV between the top and second layers of the 3D integrated circuit 1000. Additionally, a transceiver 1004 can be embedded in both the top and second layers of the 3D integrated circuit 1000 to transfer secure information wirelessly through near-field electromagnetic emission. The top layer of the 3D integrated circuit 1000 can be a layer for power management or system control of security trust management that is fabricated using a low-cost process. Each individual layer below, which in certain embodiments can be manufactured in untrusted advanced fabrication processes, can be a processor, a memory or a gate array layer for specific applications. For example, a layer n can be a gate array with a transceiver 1004 embedded in the layer.

Figure 11:
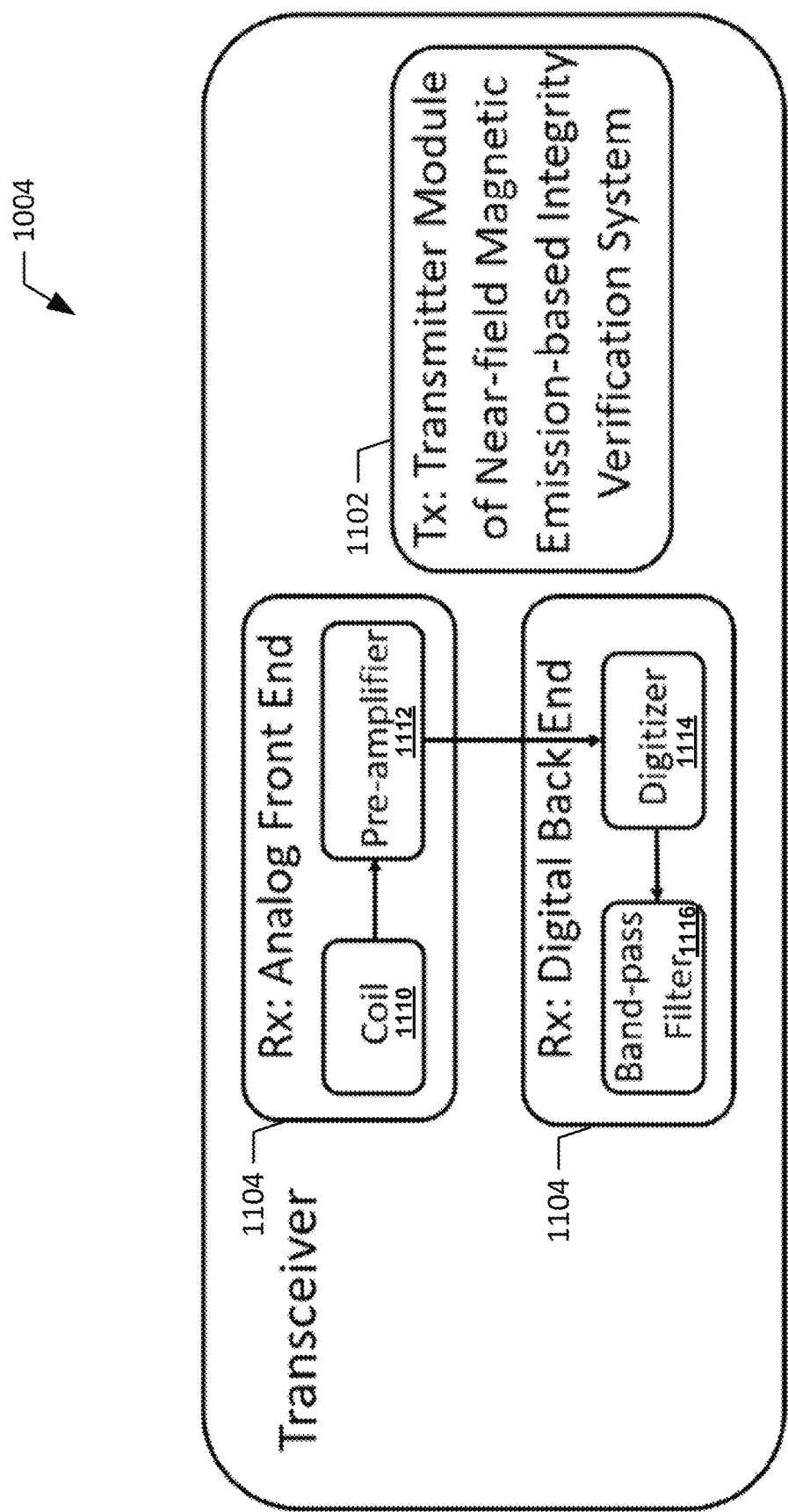
FIG. 11 illustrates an example transceiver, according to one or more embodiments of the present disclosure.

FIG. 11 further illustrates the transceiver 1004, accordingly to one or more embodiments of the present disclosure. The transceiver 1004 can be configured for wireless data communications and can comprise a transmitter 1102 for sending out secure data through electromagnetic emission. The transceiver 1004 can also comprise a receiver 1104 to securely receive the electromagnetic signals and decode the data information. The transmitter 1102 can be configured similar to the transmitter 120 illustrated in FIG. 1, the transmitter 202 illustrated in FIG. 2, and/or the transmitter 602 illustrated in FIG. 6. The receiver 1104 can comprise a coil 1110 and/or a low-noise pre-amplifier 1112 at the front end to receive the analog electromagnetic signals with maximal SNR. A digitizer 1114 and/or a band-pass filter 1116 can additionally be implemented at the digital back end of the receiver 1104. The digitizer 1114 can be an analog-to-digital converter (ADC) circuit used to digitize the received electromagnetic signals for further digital signal processing. To minimize electromagnetic interference from other layers, signals from each layer can be modulated based on frequency bands. In various embodiments, the band-pass filter 1116 can be utilized for filtering out interference different than a desired bandwidth of the secure information.

Figure 12:
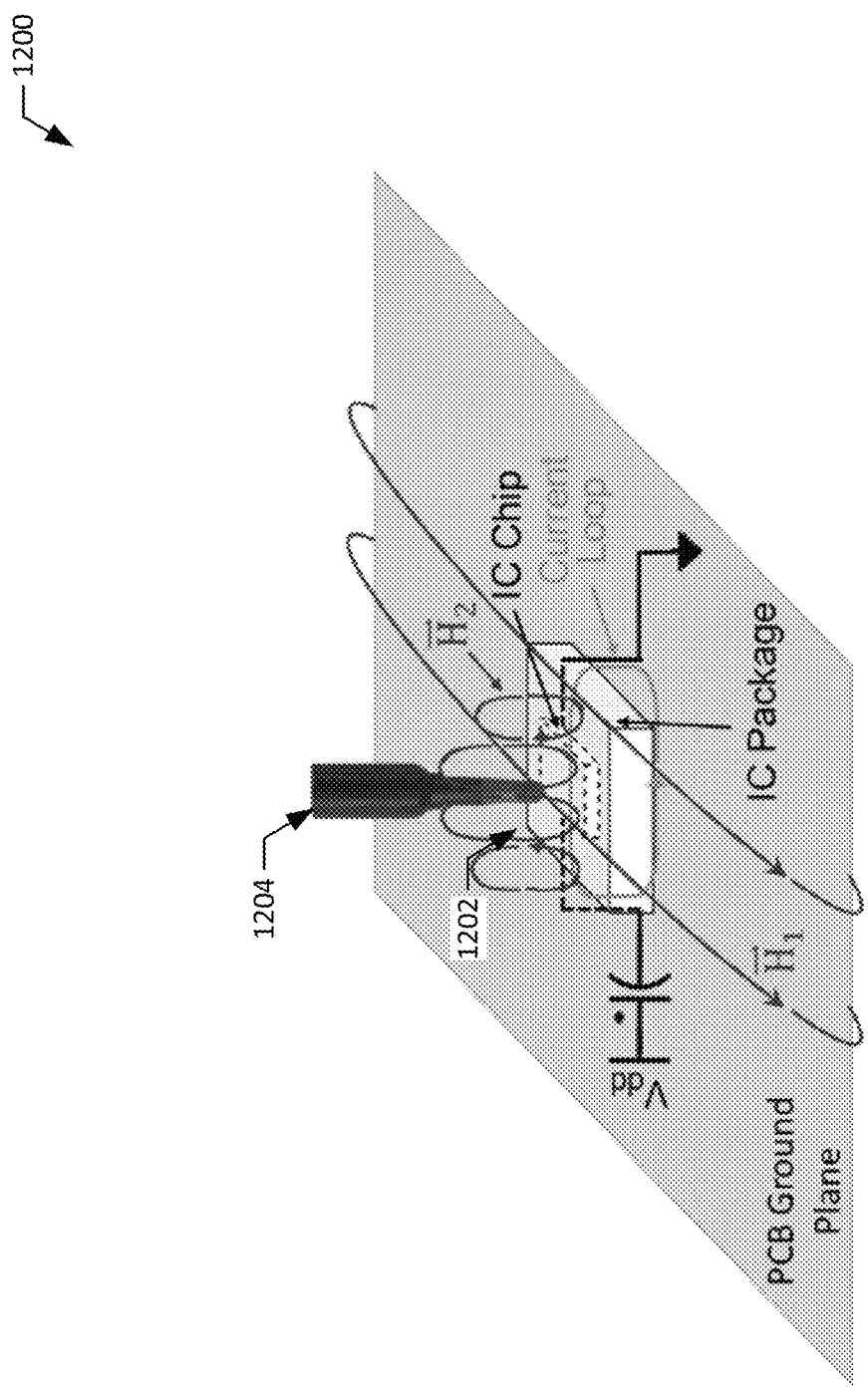
FIG. 12 system for sensing near-field magnetic emissions from an integrated circuit, according to one or more embodiments of the present disclosure.

FIG. 12 illustrates a system 1200 for sensing near-field magnetic emissions from an integrated circuit 1202, according to one or more embodiments of the present disclosure. Near-field emissions consist of two parts: 1) magnetic field $\vec{H}_2$ generated from the transient current loop across the internal IC, and 2) field $\vec{H}_1$ formed around the ground plane of the PCB. The strength of field $\vec{H}_2$, which, for example, is localized within approximately 10 mm above the surface of an integrated circuit (IC) package, is greater than field $\vec{H}_1$ and is therefore the main source of near-field emissions collected by a magnetic probe 1204. With a probe and pre-amplifier of wide bandwidth, a user can therefore capture and recover the field emission signal as an input digital signature for hardware and software authentication, as further disclosed herein.

FIG. 13 illustrates an example Hamming code 1300, according to one or more embodiments of the present disclosure. Hamming code encodes the input data with parity bits (or redundant bits) inserted at certain positions, namely those which are powers of 2 (i.e., positions 1, 2, 4, 8, 16, 32, . . . ) to generate a final Hamming-encoded vector. The total number of parity bits is determined by the following equation 1:

$$2^N \geq n + N + 1 \qquad \text{(equation 1)}$$

where N is the number of parity bits and n is the length of the input data. For a 32-bit digital signature, a minimum of 6 parity bits may be utilized to detect and correct single-bit errors since each parity bit $P_x$ governs different data bits $D_x$. In an example, parity bits $P_1$, $P_2$, $P_4$, $P_8$, $P_{16}$ and $P_{16}$ at positions 1, 2, 4, 8, 16 and 32 of a Hamming vector can be computed where $D_1$-$D_{32}$ are the data bits of a 32-bit signature. Errors in the data bits can then be detected as mismatches between the parity bit values of the original and the reconstructed digital signatures, respectively.

Figure 14:
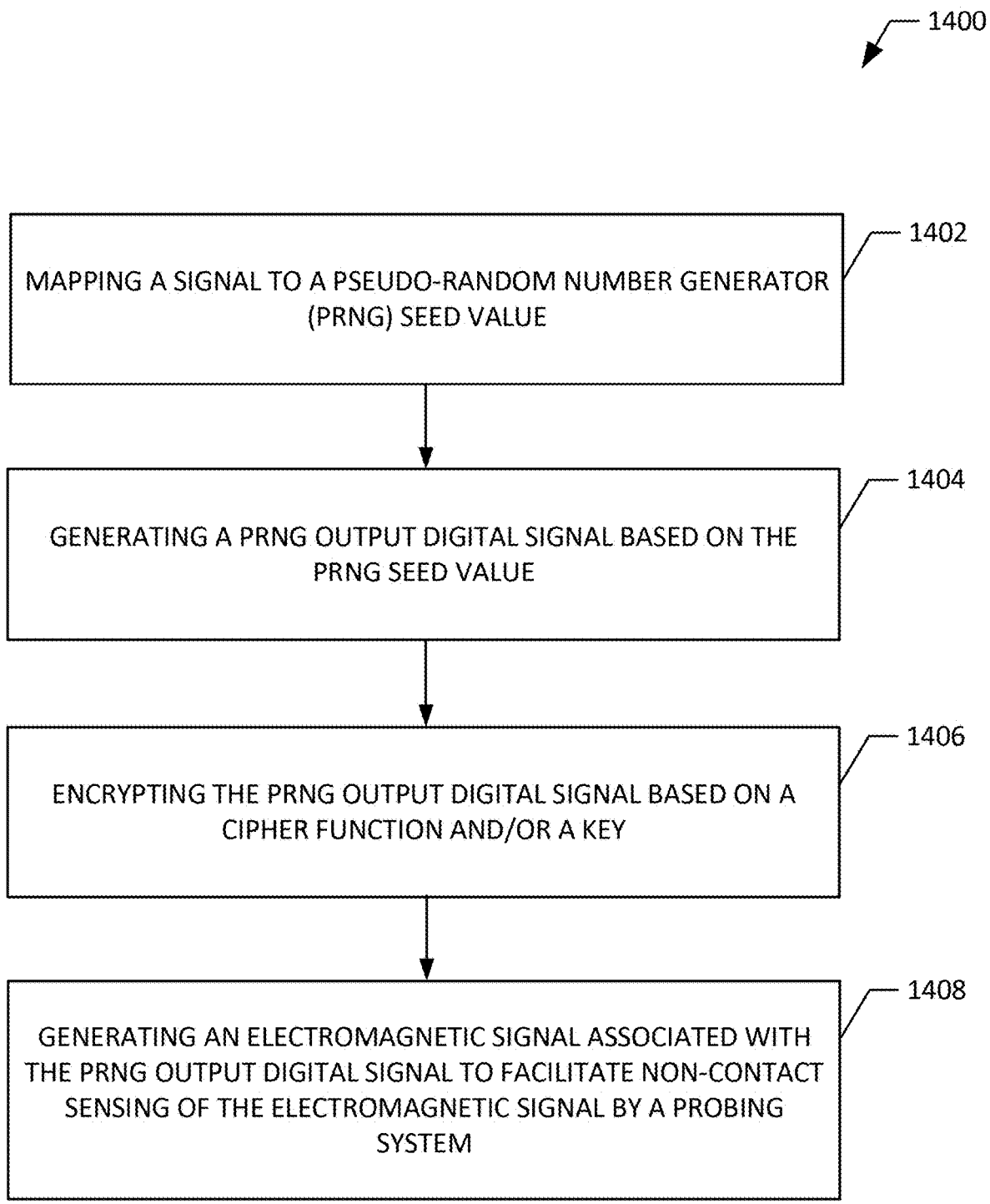
FIG. 14 illustrates a flowchart of a method for providing electromagnetic based secure contact-less integrity verification for an integrated circuit according to one or more embodiments of the present disclosure.

FIG. 14 illustrates a flowchart of a method 1400 for providing electromagnetic based secure contact-less integrity verification for an integrated circuit according to one or more embodiments of the present disclosure. In various embodiments, the method 1400 can be associated with a transmitter. According to the illustrated embodiment, the method 1400 includes a step 1402 for mapping a signal to a pseudo-random number generator (PRNG) seed value. Additionally, the method 1400 includes a step 1404 for generating a PRNG output digital signal based on the PRNG seed value. Additionally, the method 1400 includes a step 1406 for encrypting the PRNG output digital signal based on a cipher function and/or a key. Additionally, the method 1400 includes a step 1408 for generating an electromagnetic signal associated with the PRNG output digital signal to facilitate non-contact sensing of the electromagnetic signal by a probing system.

In certain embodiments, the method 1400 additionally or alternatively includes authenticating hardware for an integrated circuit based on the non-contact sensing of the electromagnetic signal by the probing system. In certain embodiments, the method 1400 additionally or alternatively includes authenticating software for an integrated circuit based on the non-contact sensing of the electromagnetic signal by the probing system.

In certain embodiments, the method 1400 additionally or alternatively includes applying an error correction technique to the PRNG output digital signal. In certain embodiments, the method 1400 additionally or alternatively includes serializing the PRNG output digital signal.

In certain embodiments, the method 1400 additionally or alternatively includes generating the PRNG output digital signal based on an FPGA-based LFSR circuit.

In certain embodiments, the method 1400 additionally or alternatively includes generating the PRNG output digital signal based on an HPS-based LFSR circuit.

In certain embodiments, the method 1400 additionally or alternatively includes generating the PRNG output digital signal based on an ASIC-based LFSR circuit.

In an example embodiment, an apparatus for performing the method 1400 of FIG. 14 above may include a processor configured to perform some or each of the steps (1402, 1404, 1406, and/or 1408) described above. The processor may, for example, be configured to perform the steps (1402, 1404, 1406, and/or 1408) by performing hardware implemented logical functions, executing stored instructions, or executing algorithms for performing each of the operations. Alternatively, the apparatus may comprise means for performing each of the operations described above. In this regard, according to an example embodiment, examples of means for performing steps 1402, 1404, 1406, and/or 1408 may comprise, for example, the processor and/or a device or circuit for executing instructions, executing operations, or executing an algorithm for processing information as described above.

Figure 15:
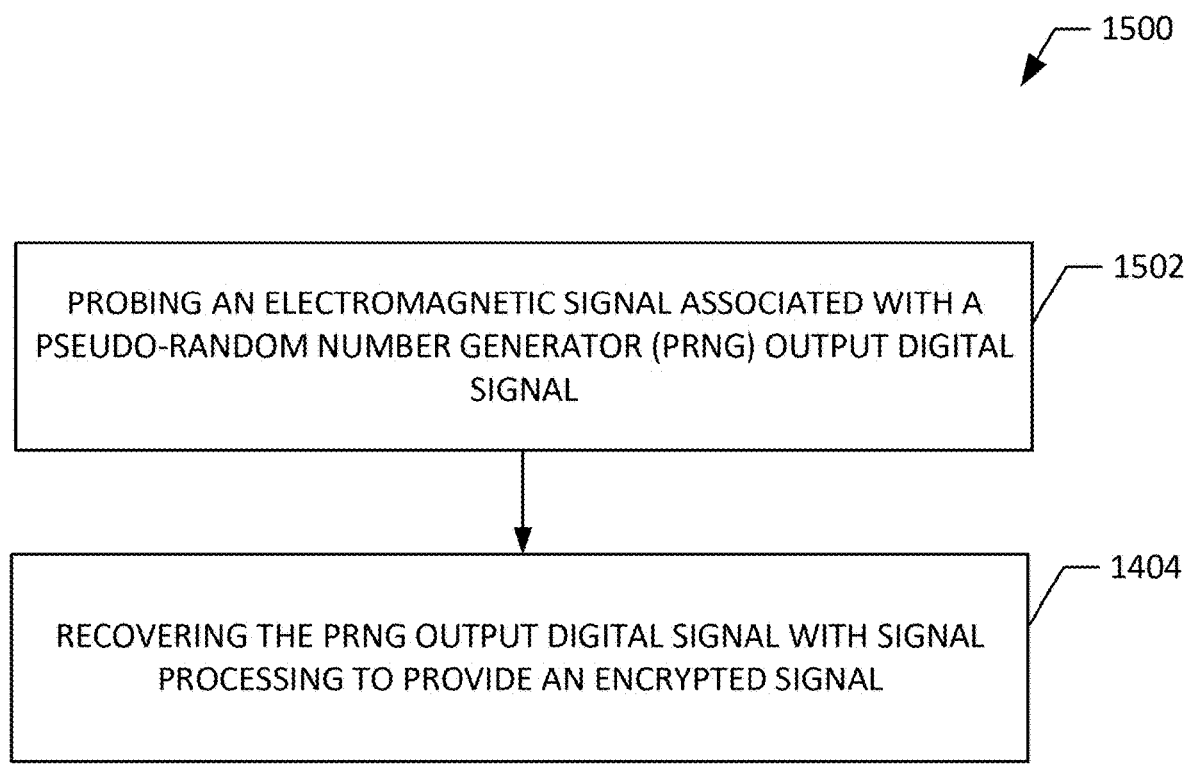
FIG. 15 illustrates a flowchart of another method for providing electromagnetic based secure contact-less integrity verification for an integrated circuit according to one or more embodiments of the present disclosure.

FIG. 15 illustrates a flowchart of a method 1500 for providing electromagnetic based secure contact-less integrity verification for an integrated circuit according to one or more embodiments of the present disclosure. In various embodiments, the method 1500 can be associated with a receiver. According to the illustrated embodiment, the method 1500 includes a step 1502 for probing an electromagnetic signal associated with a pseudo-random number generator (PRNG) output digital signal. The method 1500 additionally includes a step 1504 for recovering the PRNG output digital signal with signal processing to provide an encrypted signal. As such, non-contact sensing of the electromagnetic signal can be provided.

In certain embodiments, the method 1500 additionally or alternatively includes authenticating hardware for an integrated circuit based on the encrypted signal. In certain embodiments, the method 1400 additionally or alternatively includes authenticating software for an integrated circuit based on the encrypted signal.

In an example embodiment, an apparatus for performing the method 1500 of FIG. 15 above may include a processor configured to perform some or each of the steps (1502 and/or 1504) described above. The processor may, for example, be configured to perform the steps (1502 and/or 1504) by performing hardware implemented logical functions, executing stored instructions, or executing algorithms for performing each of the operations. Alternatively, the apparatus may comprise means for performing each of the operations described above. In this regard, according to an example embodiment, examples of means for performing steps 1502 and/or 1504 may comprise, for example, the processor and/or a device or circuit for executing instructions, executing operations, or executing an algorithm for processing information as described above.

Figure 16:
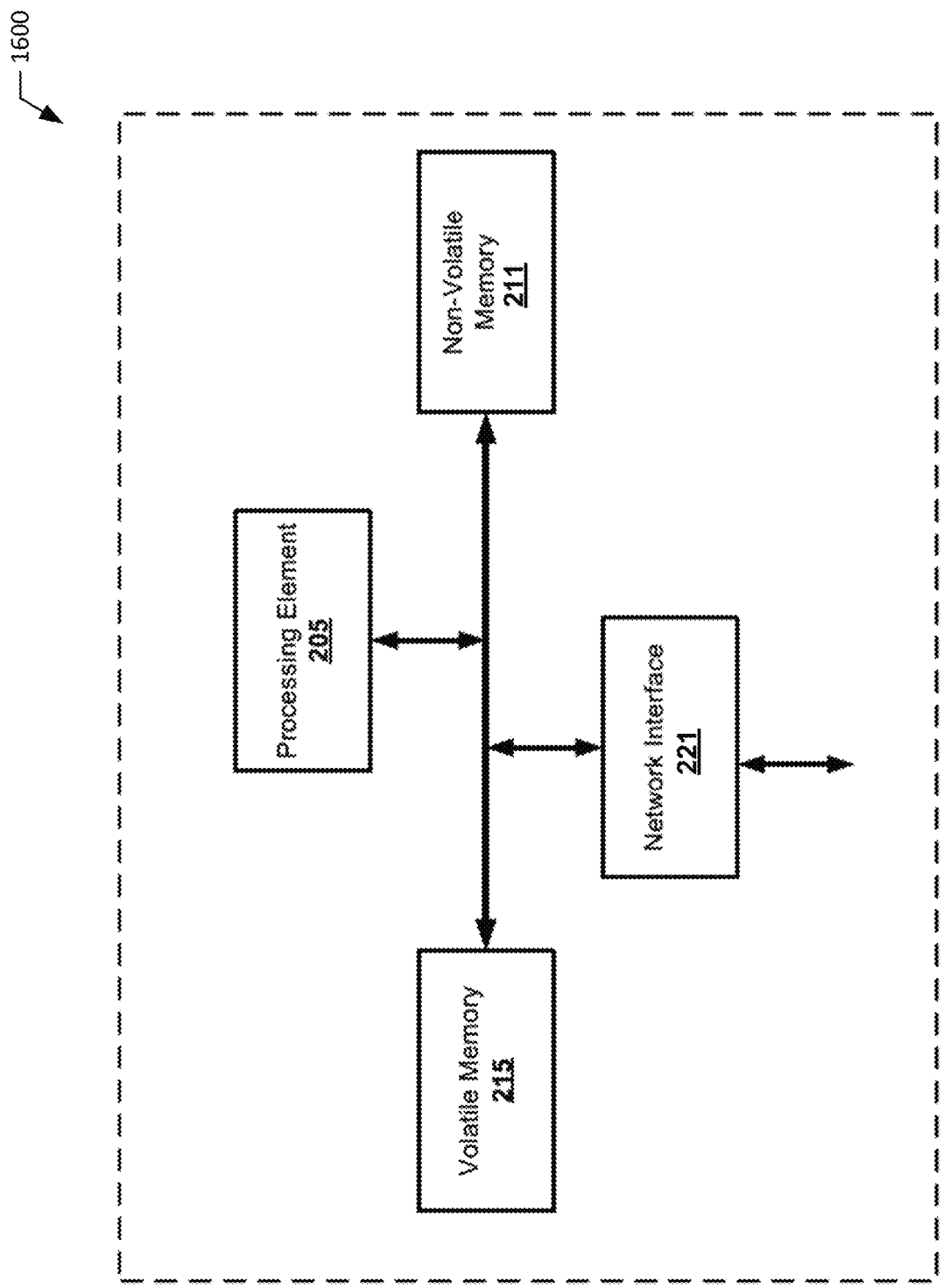
FIG. 16 illustrates a schematic of a computing entity that may be used in conjunction with one or more embodiments of the present disclosure.

In various embodiments, an apparatus for performing the method 1400 and/or the method 1500 may correspond to apparatus 1600 illustrated in FIG. 16.

B. Exemplary Technical Implementation of Various Embodiments

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a hardware description language, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

FIG. 16 provides a schematic of an exemplary apparatus 1600 that may be used in accordance with various embodiments of the present disclosure. In particular, the apparatus 1600 may be configured to perform various example operations described herein to provide for electromagnetic based secure contact-less integrity verification of hardware and/or software for integrated circuits. In some example embodiments, the apparatus 1600 may be embodied by a transmitter, a receiver, and/or a transceiver associated with the architecture 200, the architecture 600, the 3D integrated circuit 1000, and/or the transceiver 1004.

In general, the terms computing entity, entity, device, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the field should appreciate that the apparatus 1600 shown in FIG. 16 may be embodied as a plurality of computing entities, tools, and/or the like operating collectively to perform one or more processes, methods, and/or steps. As just one non-limiting example, the apparatus 1600 may comprise a plurality of individual data tools, each of which may perform specified tasks and/or processes.

Depending on the embodiment, the apparatus 1600 may include one or more network and/or communications interfaces 221 for communicating with various computing entities, such as by communicating data, content, information, and/or similar terms used herein interchangeably that can be transmitted, received, operated on, processed, displayed, stored, and/or the like. Thus, in certain embodiments, the apparatus 1600 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the apparatus 1600 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), 5G New Radio (5G NR), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibrec, Bluetooth protocols, wireless universal serial bus (USB) protocols, and/or any other wireless protocol. The apparatus 1600 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the apparatus 1600 includes or is in communication with one or more processing elements 205 (also referred to as processors, processing circuitry, and/or similar terms used herein interchangeably) that communicate with other elements within the apparatus 1600 via a bus, for example, or network connection. As will be understood, the processing element 205 may be embodied in several different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware, computer program products, or a combination thereof, the processing element 205 may be capable of performing steps or operations according to embodiments of the present disclosure when configured accordingly.

In various embodiments, the apparatus 1600 may include or be in communication with non-volatile media (also referred to as non-volatile storage, memory, memory storage, memory circuitry and/or similar terms used herein interchangeably). For instance, the non-volatile storage or memory may include one or more non-volatile storage or non-volatile memory media 211 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or non-volatile memory media 211 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense refer to a structured or unstructured collection of information/data that is stored in a computer-readable storage medium.

In particular embodiments, the non-volatile memory media 211 may also be embodied as a data storage device or devices, as a separate database server or servers, or as a combination of data storage devices and separate database servers. Further, in some embodiments, the non-volatile memory media 211 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the apparatus 1600 may further include or be in communication with volatile media (also referred to as volatile storage, memory, memory storage, memory circuitry and/or similar terms used herein interchangeably). For instance, the volatile storage or memory may also include one or more volatile storage or volatile memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like.

As will be recognized, the volatile storage or volatile memory media 215 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 205. Thus, the databases, database instances, database management system entities, data, images, applications, programs, program modules, scripts, source code, object code, byte code, compiled code, interpreted code, machine code, executable instructions, and/or the like may be used to control certain aspects of the operation of the apparatus 1600 with the assistance of the processing element 205 and operating system.

As will be appreciated, one or more of the computing entity's components may be located remotely from the other computing entity components, such as in a distributed system. Furthermore, one or more of the components may be aggregated, and additional components performing functions described herein may be included in the apparatus 1600. Thus, the apparatus 1600 can be adapted to accommodate a variety of needs and circumstances.

C. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing electromagnetic based secure contact-less integrity verification for an integrated circuit, the method comprising:
   mapping a signal to a pseudo-random number generator (PRNG) seed value;
   generating a PRNG output digital signal based on the PRNG seed value;
   encrypting the PRNG output digital signal based on a cipher function and a key; and
   generating an electromagnetic signal associated with the PRNG output digital signal to facilitate non-contact sensing of the electromagnetic signal by a probing system.

2. The method of claim 1, further comprising:
   authenticating hardware for the integrated circuit based on the non-contact sensing of the electromagnetic signal by the probing system.

3. The method of claim 1, further comprising:
   authenticating software for the integrated circuit based on the non-contact sensing of the electromagnetic signal by the probing system.

4. The method of claim 1, further comprising:
   applying an error correction technique to the PRNG output digital signal; and
   serializing the PRNG output digital signal.

5. The method of claim 1, further comprising:
   generating the PRNG output digital signal based on a field programmable gate array (FPGA)-based linear-feedback shift register (LFSR) circuit.

6. The method of claim 1, further comprising:
   generating the PRNG output digital signal based on a hard processor system (HPS)-based linear-feedback shift register (LFSR) circuit.

7. The method of claim 1, further comprising:
   generating the PRNG output digital signal based on an application-specific integrated circuit (ASIC)-based linear-feedback shift register (LFSR) circuit.

8. An apparatus comprising at least one processor and at least one memory including program code, the at least one memory and the program code configured to, with the at least one processor, cause the apparatus to at least:
   map a signal to a pseudo-random number generator (PRNG) seed value;
   generate a PRNG output digital signal based on the PRNG seed value;
   encrypt the PRNG output digital signal based on a cipher function and a key; and generate an electromagnetic signal associated with the PRNG output digital signal to facilitate non-contact sensing of the electromagnetic signal by a probing system.

9. The apparatus of claim 8, wherein the at least one memory and the program code are configured to, with the at least one processor, further cause the apparatus to at least:
authenticate hardware for an integrated circuit based on the non-contact sensing of the electromagnetic signal by the probing system.

10. The apparatus of claim 8, wherein the at least one memory and the program code are configured to, with the at least one processor, further cause the apparatus to at least:
authenticate software for an integrated circuit based on the non-contact sensing of the electromagnetic signal by the probing system.

11. The apparatus of claim 8, wherein the at least one memory and the program code are configured to, with the at least one processor, further cause the apparatus to at least:
apply an error correction technique to the PRNG output digital signal; and
serialize the PRNG output digital signal.

12. The apparatus of claim 8, wherein the at least one memory and the program code are configured to, with the at least one processor, further cause the apparatus to at least:
generate the PRNG output digital signal based on a field programmable gate array (FPGA)-based linear-feedback shift register (LFSR) circuit.

13. The apparatus of claim 8, wherein the at least one memory and the program code are configured to, with the at least one processor, further cause the apparatus to at least:
generate the PRNG output digital signal based on a hard processor system (HPS)-based linear-feedback shift register (LFSR) circuit.

14. The apparatus of claim 8, wherein the at least one memory and the program code are configured to, with the at least one processor, further cause the apparatus to at least:
generate the PRNG output digital signal based on an application-specific integrated circuit (ASIC)-based linear-feedback shift register (LFSR) circuit.

15. A non-transitory computer storage medium comprising instructions, the instructions being configured to cause one or more processors to at least perform operations configured to:
map a signal to a pseudo-random number generator (PRNG) seed value;
generate a PRNG output digital signal based on the PRNG seed value;
encrypt the PRNG output digital signal based on a cipher function and a key; and
generate an electromagnetic signal associated with the PRNG output digital signal to facilitate non-contact sensing of the electromagnetic signal by a probing system.

16. The non-transitory computer storage medium of claim 15, wherein the operations are further configured to:
authenticate an integrated circuit based on the non-contact sensing of the electromagnetic signal by the probing system.

17. The non-transitory computer storage medium of claim 15, wherein the operations are further configured to:
apply an error correction technique to the PRNG output digital signal; and
serialize the PRNG output digital signal.

18. The non-transitory computer storage medium of claim 15, wherein the operations are further configured to:
generate the PRNG output digital signal based on a field programmable gate array (FPGA)-based linear-feedback shift register (LFSR) circuit.

19. The non-transitory computer storage medium of claim 15, wherein the operations are further configured to:
generate the PRNG output digital signal based on a hard processor system (HPS)-based linear-feedback shift register (LFSR) circuit.

20. The non-transitory computer storage medium of claim 15, wherein the operations are further configured to:
generate the PRNG output digital signal based on an application-specific integrated circuit (ASIC)-based linear-feedback shift register (LFSR) circuit.

* * * * *